US010197038B2

(12) United States Patent
Culpepper

(10) Patent No.: US 10,197,038 B2
(45) Date of Patent: Feb. 5, 2019

(54) HELICAL LONGITUDINAL BLADE TURBINE SYSTEM INCLUDING A FUNNEL THROAT VALVE COMPRISING A PLURALITY OF SEMI-CIRCULAR VALVE PLATES

(71) Applicant: Charles B. Culpepper, Hot Springs, AR (US)

(72) Inventor: Charles B. Culpepper, Hot Springs, AR (US)

( * ) Notice: Subject to any disclaimer, the term of this patent is extended or adjusted under 35 U.S.C. 154(b) by 0 days.

(21) Appl. No.: 15/692,049

(22) Filed: Aug. 31, 2017

(65) Prior Publication Data

US 2018/0003144 A1 Jan. 4, 2018

Related U.S. Application Data

(63) Continuation-in-part of application No. 14/859,077, filed on Sep. 18, 2015, now Pat. No. 9,759,179.

(51) Int. Cl.
| | |
|---|---|
| *F03B 3/04* | (2006.01) |
| *F03B 3/12* | (2006.01) |
| *H02K 7/116* | (2006.01) |
| *F03B 11/02* | (2006.01) |
| *F03B 11/06* | (2006.01) |
| *H02K 7/18* | (2006.01) |
| *F03B 3/18* | (2006.01) |
| *F03B 11/00* | (2006.01) |

(Continued)

(52) U.S. Cl.
CPC ............... *F03B 3/04* (2013.01); *F03B 3/121* (2013.01); *F03B 3/126* (2013.01); *F03B 3/183* (2013.01); *F03B 11/004* (2013.01); *F03B 11/02* (2013.01); *F03B 11/06* (2013.01); *F03B 13/264* (2013.01); *F03B 17/061* (2013.01); *H02K 7/1163* (2013.01); *H02K 7/1823* (2013.01); *F05B 2220/706* (2013.01); *F05B 2240/122* (2013.01); *F05B 2240/132* (2013.01); *F05B 2240/24* (2013.01); *F05B 2240/30* (2013.01); *F05B 2250/25* (2013.01); *F05B 2260/4031* (2013.01); *Y02E 10/223* (2013.01); *Y02E 10/28* (2013.01)

(58) Field of Classification Search
None
See application file for complete search history.

(56) References Cited

U.S. PATENT DOCUMENTS

| 1,660,634 A | * | 2/1928 | Thomas | .................. E21B 21/10 137/496 |
|---|---|---|---|---|
| 1,816,971 A | * | 8/1931 | Hoff | ...................... F03B 17/061 415/3.1 |

(Continued)

FOREIGN PATENT DOCUMENTS

JP        57015172 A   *   1/1982

*Primary Examiner* — Tulsidas C Patel
*Assistant Examiner* — S. Mikailoff
(74) *Attorney, Agent, or Firm* — Joe D. Calhoun

(57) ABSTRACT

The invention disclosed herein comprises a system focusing water current into a relatively smaller diameter lumen, imparting vortical movement to the current, and directing the water vortex through an even smaller diameter lumen en route to turbine blades having long curved blades rotatable along an axis parallel with the lumen. Rotation of the turbine blades turns gearing interfacing with the circumference of the turbine assembly, to rotate a drive shaft connected to a generator.

15 Claims, 21 Drawing Sheets

(51) Int. Cl.
*F03B 17/06* (2006.01)
*F03B 13/26* (2006.01)

(56) References Cited

U.S. PATENT DOCUMENTS

| | | | | |
|---|---|---|---|---|
| 1,817,538 A * | 8/1931 | Van Sickle | F16K 3/06 | 251/212 |
| 1,882,966 A * | 10/1932 | Schaffner | F02M 1/00 | 138/37 |
| 2,199,894 A * | 5/1940 | Phelps | B65G 53/46 | 251/212 |
| 3,074,427 A * | 1/1963 | Wheeler, Jr. | F16K 1/223 | 137/315.16 |
| 3,198,423 A * | 8/1965 | Clute | F04D 19/022 | 415/148 |
| 3,400,821 A * | 9/1968 | Singleton | B01D 35/153 | 210/136 |
| 4,021,135 A * | 5/1977 | Pedersen | F03D 1/04 | 415/208.2 |
| 4,086,498 A * | 4/1978 | Szoeke | F03D 1/04 | 290/55 |
| 4,143,999 A * | 3/1979 | Ryall | F03B 3/04 | 415/72 |
| 4,163,904 A * | 8/1979 | Skendrovic | F03B 13/10 | 277/369 |
| 4,219,303 A * | 8/1980 | Mouton, Jr. | F03B 17/061 | 415/123 |
| 4,249,567 A * | 2/1981 | Weiss | F16K 15/038 | 137/512 |
| 4,257,444 A * | 3/1981 | Ogle, Jr. | F16K 1/223 | 137/315.13 |
| 4,258,271 A * | 3/1981 | Chappell | F03B 13/10 | 290/54 |
| 4,272,685 A * | 6/1981 | Toyama | F03B 13/06 | 290/52 |
| 4,274,009 A * | 6/1981 | Parker, Sr. | F03B 17/061 | 290/43 |
| 4,320,304 A * | 3/1982 | Karlsson | F03D 1/04 | 290/55 |
| 4,324,985 A * | 4/1982 | Oman | F03D 1/04 | 290/55 |
| 4,424,452 A * | 1/1984 | Francis | B60K 16/00 | 290/55 |
| 4,600,360 A * | 7/1986 | Quarterman | F03D 1/04 | 415/148 |
| 4,648,788 A * | 3/1987 | Jochum | B63H 1/16 | 415/124.1 |
| 4,816,697 A * | 3/1989 | Nalbandyan | F03B 3/04 | 290/43 |
| 5,392,810 A * | 2/1995 | Cooper | F16K 15/038 | 137/512.1 |
| 5,501,574 A * | 3/1996 | Raible | F04D 29/2277 | 415/143 |
| 5,711,343 A * | 1/1998 | Beckett | F16K 15/038 | 137/512.1 |
| 6,036,443 A * | 3/2000 | Gorlov | F03B 3/00 | 416/176 |
| 7,348,686 B2 * | 3/2008 | Fielder | F03B 17/061 | 290/43 |
| 7,425,772 B2 * | 9/2008 | Novo Vidal | F03B 13/083 | 290/52 |
| 7,768,145 B2 * | 8/2010 | Susman | F03B 13/264 | 290/43 |
| 8,115,329 B2 * | 2/2012 | Thompson | F01D 5/141 | 290/43 |
| 8,350,400 B2 * | 1/2013 | Rosefsky | F03B 13/00 | 290/52 |
| 8,546,969 B2 * | 10/2013 | Rosefsky | F03B 13/00 | 290/52 |
| 8,633,609 B2 * | 1/2014 | Cornelius | E02B 9/00 | 290/54 |
| 8,754,540 B2 * | 6/2014 | Ives | F03B 13/10 | 290/42 |
| 8,853,873 B2 * | 10/2014 | Urch | F03B 17/061 | 290/43 |
| 9,599,090 B2 * | 3/2017 | Dale | F03B 3/04 | |
| 9,759,179 B2 * | 9/2017 | Culpepper | F03B 3/126 | |
| 2001/0031210 A1 * | 10/2001 | Antaki | F04D 3/005 | 417/356 |
| 2007/0241566 A1 * | 10/2007 | Kuehnle | F03B 17/061 | 290/53 |
| 2008/0088135 A1 * | 4/2008 | Novo Vidal | F03B 13/083 | 290/54 |
| 2010/0066089 A1 * | 3/2010 | Best | F03B 3/06 | 290/52 |
| 2010/0283248 A1 * | 11/2010 | Moffat | F03B 13/22 | 290/52 |
| 2011/0037265 A1 * | 2/2011 | Fielder | F01D 15/10 | 290/52 |
| 2011/0305518 A1 * | 12/2011 | Pearce | B63B 35/44 | 405/75 |
| 2014/0017065 A1 * | 1/2014 | Dale | F03B 3/04 | 415/68 |
| 2015/0111752 A1 * | 4/2015 | Guina | H02K 31/00 | 505/163 |
| 2016/0177911 A1 * | 6/2016 | Kouris | F03B 3/02 | 290/52 |
| 2017/0145981 A1 * | 5/2017 | Culpepper | F03B 3/126 | |
| 2018/0003144 A1 * | 1/2018 | Culpepper | F03B 13/264 | |

* cited by examiner

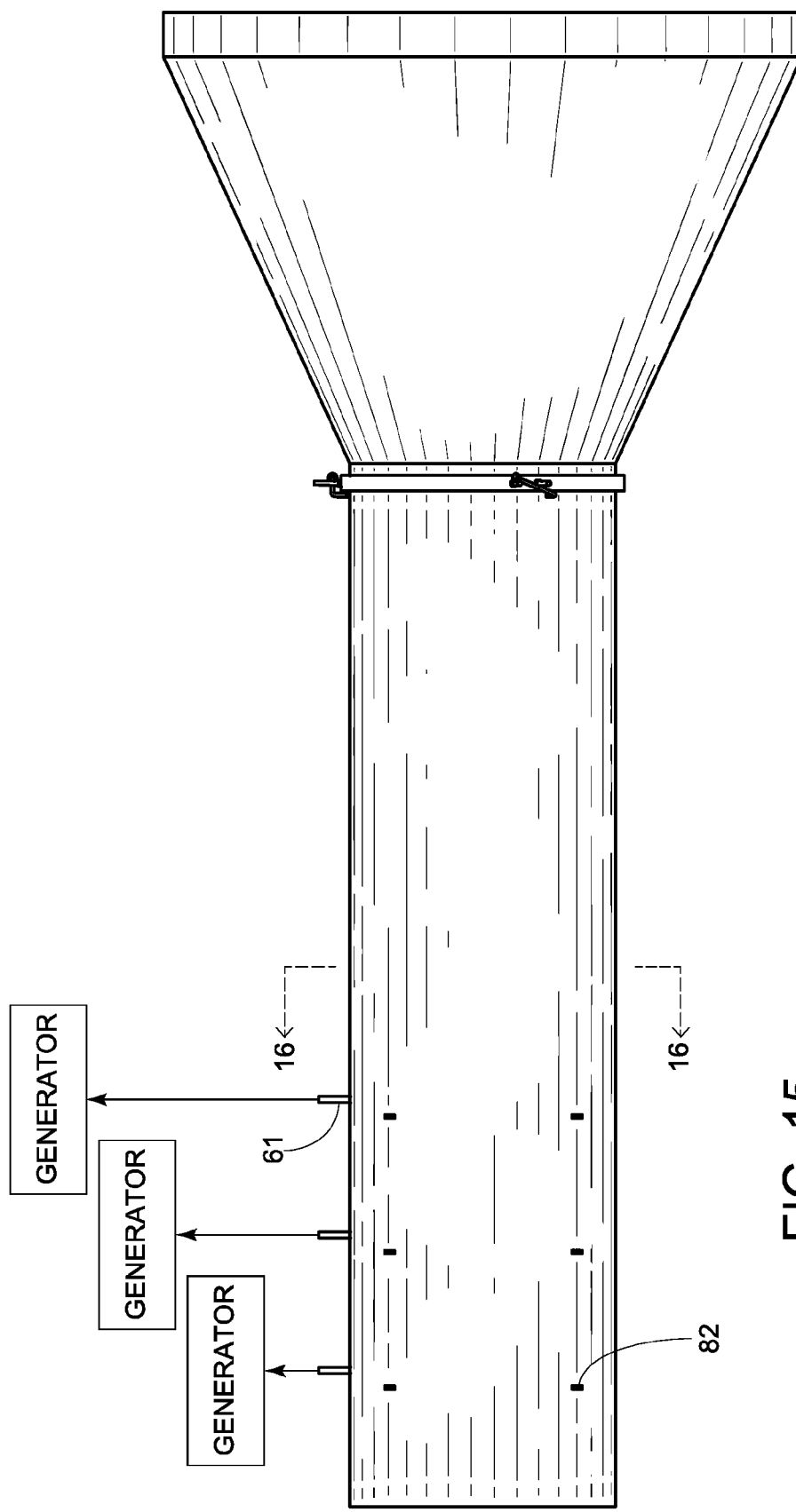

HELICAL LONGITUDINAL BLADE TURBINE SYSTEM INCLUDING A FUNNEL THROAT VALVE COMPRISING A PLURALITY OF SEMI-CIRCULAR VALVE PLATES

CROSS REFERENCE TO RELATED APPLICATIONS

This application claims the benefit of priority of U.S. utility patent application Ser. No. 14/859,077 filed 18 Sep. 2015, now U.S. Pat. No. 9,759,179 issued 12 Sep. 2017, the contents of which are incorporated herein by reference.

FEDERALLY SPONSORED RESEARCH AND DEVELOPMENT

Not applicable.

MICROFICHE APPENDIX

Not applicable.

BACKGROUND OF THE INVENTION

(1) Field of the Invention

The present disclosure relates to the field of hydro-electric generator systems. This field includes systems for better utilizing water currents for producing electricity. More particularly, the invention disclosed herein relates to a turbine having an improved design for collecting and concentrating water current and feeding it to the turbine blades having improved designs for harnessing the force of the water current and converting that force for producing electricity.

(2) Background of Invention

Water current is one source of abundant and consistent force that is not being fully utilized to generate electricity. Currents are found in waterways and bodies of water around the world. One example close to the United States is the Gulf Stream off the east coast. Other currents (flowing water) also present themselves in tidal basins and numerous fresh water systems. Additionally there is the outflow current from existing dam systems.

The apparatus that is described herein provides a means to utilize these forces, great or small. The apparatus described herein is scalable as well; it can be made in the size suitable to take full advantage of the force of the current it is deployed in. The environmental conditions can be the main determiner of the size of device needed for utilizing the force of a current.

The apparatus disclosed herein provides a means to use several of the properties of water. Water is a true "fluid", not compressible. Water is also approximately 8 times as dense as air; a two mile per hour current can approximate the force of a one hundred mile per hour wind.

Traditionally, paddle wheel arrangements have been prevalent, with the turbine blades having their longest edge and face perpendicular to the water flow; but when submerged, such turbine blades lose efficiency, because the travel circuit of the blades causes the blades to move upstream, against the current, almost half of the time. The structure supporting such turbines often impedes water flow as well. There are also designs of turbines using blades configured as propellers. However, the propeller blade designs are typically based upon aerodynamics, not hydrodynamics. Such blades interact sparingly with the water force, and do not provide a means to take full advantage of the properties of water. Since both types of prior art are also typically in an open rather than closed (or confined) system, they also allow the water mass creating the force to escape without amplifying its force.

The following are arguably material to patentability of the invention disclosed herein.

| U.S. Pat. No./ application Ser. No. | 1$^{st}$ Named Inventor | Date of Patent/ Publication |
|---|---|---|
| 6,223,532 | Angel Brassea-Flores | May 1, 2001 |
| 8,801,359 | Gordon David Sherrer | Aug. 12, 2014 |
| 20060169322 | John E. Torkelson | Aug. 3, 2006 |
| 4,622,471 | Warren C. Schroeder | Nov. 11, 1986 |
| 4,172,689 | Ivar Thorsheim | Oct. 30, 1979 |

U.S. Pat. No. 8,801,359 issued to Sherrer discloses a system for extracting power from fluid (including river and ocean currents) using a bladeless disc turbine. This patent discloses a plurality of funnel-shaped fluid receiving inlets, collecting water current and increasing its velocity before delivery at "advantageous attack angles" to disc turbines spaced upon a common axle. (See FIGS. 1, 4 and 15.) This patent does not expressly disclose an upstream funnel defining a constricting conduit channeling water into a throat-valve including stationary pivot-gates enhancing the vortical movement of the water through a further constricting conduit feeding the water to the blades of a turbine rotating around a horizontal axle positioned parallel to the flow of water.

U.S. Pat. No. 4,172,689 issued to Thorsheim discloses a wave power generator having a plurality of side-by-side open funnels (with square or rectangular cross-sections) concentrating water flow en route to a shared manifold feeding the fast-moving fluid to a paddle-wheel turbine generator. (Best illustrated in FIGS. 4 and 5.)

U.S. Pat. No. 4,622,471 issued to Schroeder discloses an ocean wave hydro-electric generator facility for converting an entire ocean wave (at its peak kinetic force) to a continuous "river flow" penstock (conduit) and race (current) feeding the turbine. This patent discloses "upstream" horizontally-hinged intake gates adapted to permit the incoming waves to slide over the top of the downwardly pivoting gates and into the penstock, where it is fed in a continuous flow to a hydro-electric generator.

U.S. Pat. No. 6,223,532 issued to Brassea-Flores discloses hydro-electric turbines rotated by fluid in motion. One embodiment involves the injection of pressurized gas into a hollow axle carrying a funnel-shaped member having outlets for releasing the gas; when the turbine is submersed, the released gas causes the turbine to rotate on the axle to generate energy.

None of these references expressly discloses a hydro-electric generator system comprising an upstream funnel housing orientable in the same direction as water current and defining a constricting horizontal lumen, a throat including a throat-valve, and a turbine having a plurality of blades rotatable around an axis along the same direction as water current, the funnel initiating vortical movement of water into the throat-valve which, when in an open configuration, enhances the vortical movement of water to the blades for rotational force.

BRIEF SUMMARY OF THE INVENTION

In most general terms, the invention disclosed herein comprises a system focusing water current into a relatively smaller diameter lumen (tubular cavity), imparting vortical movement to the current, and directing the water vortex through an even smaller diameter lumen en route to turbine blades having long curved blades rotatable along an axis parallel with the lumen. Rotation of the turbine blades turns gearing interfacing with the circumference of the turbine assembly, to rotate a drive shaft connected to a generator. The invention disclosed herein is essentially a hydro-electric turbine system comprising an upstream funnel defining a constricting conduit channeling water into a throat-valve including stationary pivot-gates enhancing the vortical movement of the water through a further constricting conduit feeding the water to the blades of a turbine rotating around a horizontal axle positioned parallel to the flow of water.

The basic concept of the apparatus is a combination of technologies, but with a twist. The force of water is normally looked at to generate power (electricity), traditionally as by a hydro-electric dam system. This apparatus potentially utilizes the currents of all forms of bodies of water, both fresh and salt, to focus the current's power into the system to produce power. The potential of for generating electricity using water current force is immense. For example, off the eastern coast of the United States is the Gulf Stream, a current that continually flows. It has been estimated that it alone has the combined flow of all of the rivers of the world multiplied by seventy (70). It also has the added benefit of continuous flow, whereas a hydro-electric power dam often relies upon a reservoir that has to be restored periodically. The funnel and throat-valve disclosed herein provide a means to create rotation and increase water velocity, and focus the force of water into the turbine as a spiraling mass of water force impacting the turbine blades over a relatively substantial distance. Such force over distance provides a means to capture and convert the movement of water into usable energy, with less impedance by the structure.

The length of the turbine and the length of the blades of the invention disclosed herein are scalable, to provide as much interaction with the water force as is optimal for the generation of electricity. The disclosed apparatus utilizes a turbine designed to capture more of the force of the water current, with less loss from the structure of the apparatus.

The invention disclosed herein has advantages at various stages of the system.

STAGE ONE, the funnel opening: channels the water current into the system. By using Bernoulli's Principle of fluid dynamics, the funnel reduces the size of the bore of the tube. Since water is a "true" fluid it cannot be compressed. Therefore in order for the mass (water) to proceed into the system, its velocity must increase.

STAGE TWO, the valve or damper: This is where the twist occurs. By placing a valve or damper in a manner depicted, there is a vortex started. It typically produces a counter clockwise rotation. This vortex is important for the turbine phase.

STAGE THREE, the vortex chamber: continues to focus the force of the current direction, organizes the twisting vortex prior to entering the turbine phase. There is a further reduction in the diameter of the chamber by placing reducing rings that match the diameter of the chamber to the interior of the turbine circumference; this will again increase velocity of the current and further focus the force and vortex.

STAGE FOUR: the turbine: the design of the turbine takes advantage of the density of water (approximately 8 times the density of air) and also the interaction with the force of the water current over a distance. One embodiment also utilizes the circumference of the turbine rather than a central axis of axle, as the point of connection with the generator or an intermediate drive shaft. Another embodiment has an open bore, to allow any objects to pass through the system; this would include any life forms that may interact with the system.

BRIEF DESCRIPTION OF FIGURES OF THE DRAWINGS

FIG. 5B depicts a portion of an upstream end of a sleeve (51), radial struts (31), and a canister (41) together with an annular convergence collar (71).

FIG. 9B depicts a sleeve (51) defining a lumen (54) and having a cogged ring (52), together with an annular convergence collar (71); also depicted in FIG. 9B is an arrangement of blades forming an interior passageway (55) and each having a peripheral edge (22) for anchoring to the sleeve, an axial edge (21) and a vortically curved primary face (23). Also depicted are two halves of the rail ring (42a and 42b), removed from the canister and separated by broken lines.

FIG. 12B depicts a portion of an upstream end of a sleeve (51), radial struts (31) having a cone (81) having its apex pointing upstream within the water flow, and a canister (41) together with an annular convergence collar (71).

FIG. 15 depicts a side elevation view of the invention of FIG. 14, including a plurality of drive shafts (61) and sets of rail-riding wheels (82) associated with one or more sleeved turbine subunits.

DETAILED DESCRIPTION OF THE INVENTION

Figure 1:
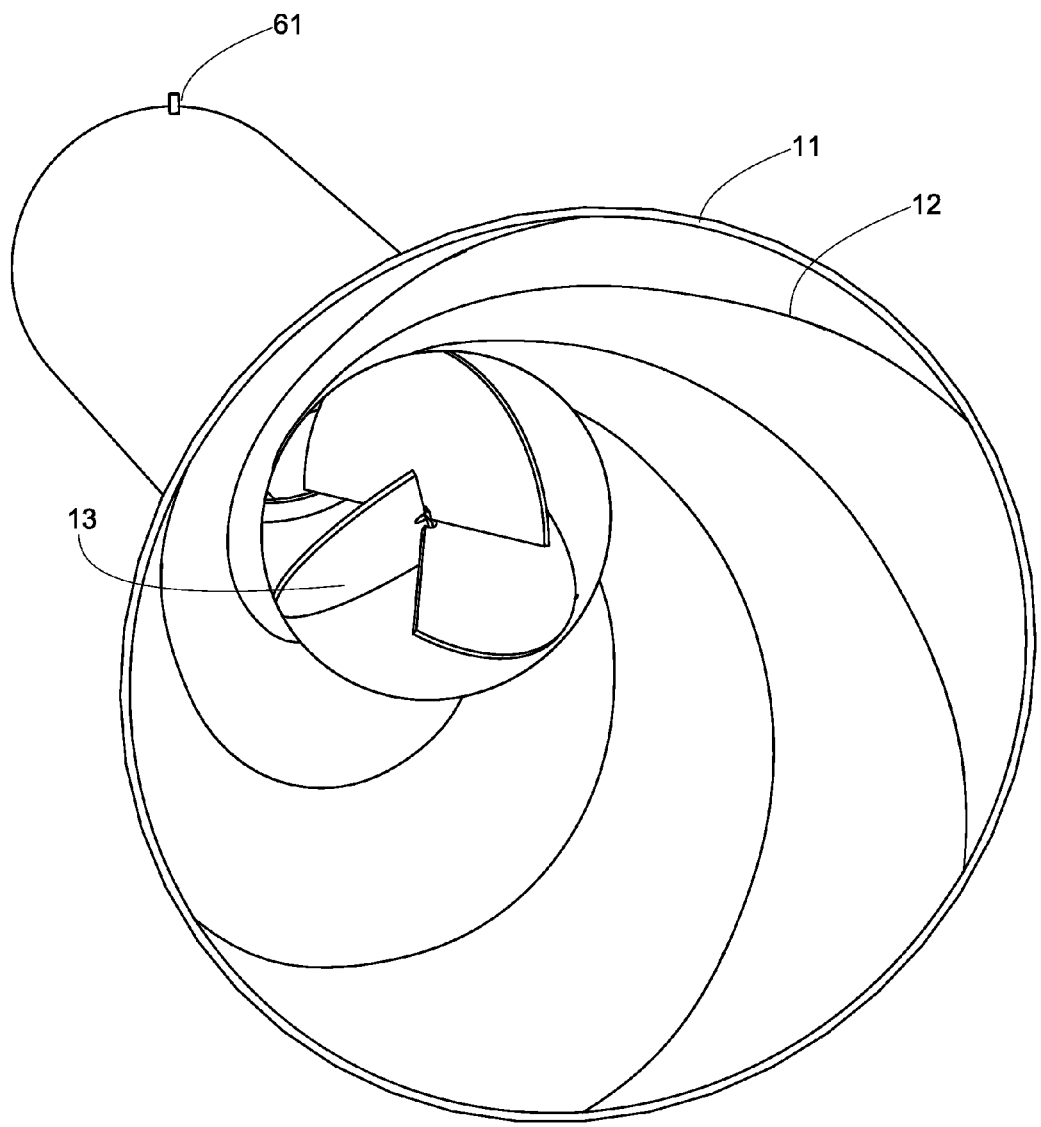
FIG. 1 depicts an upstream perspective view of a representative sample of one embodiment of the invention, with the throat valve pivot-plates (13) in a fully open configuration.
Figure 2A:
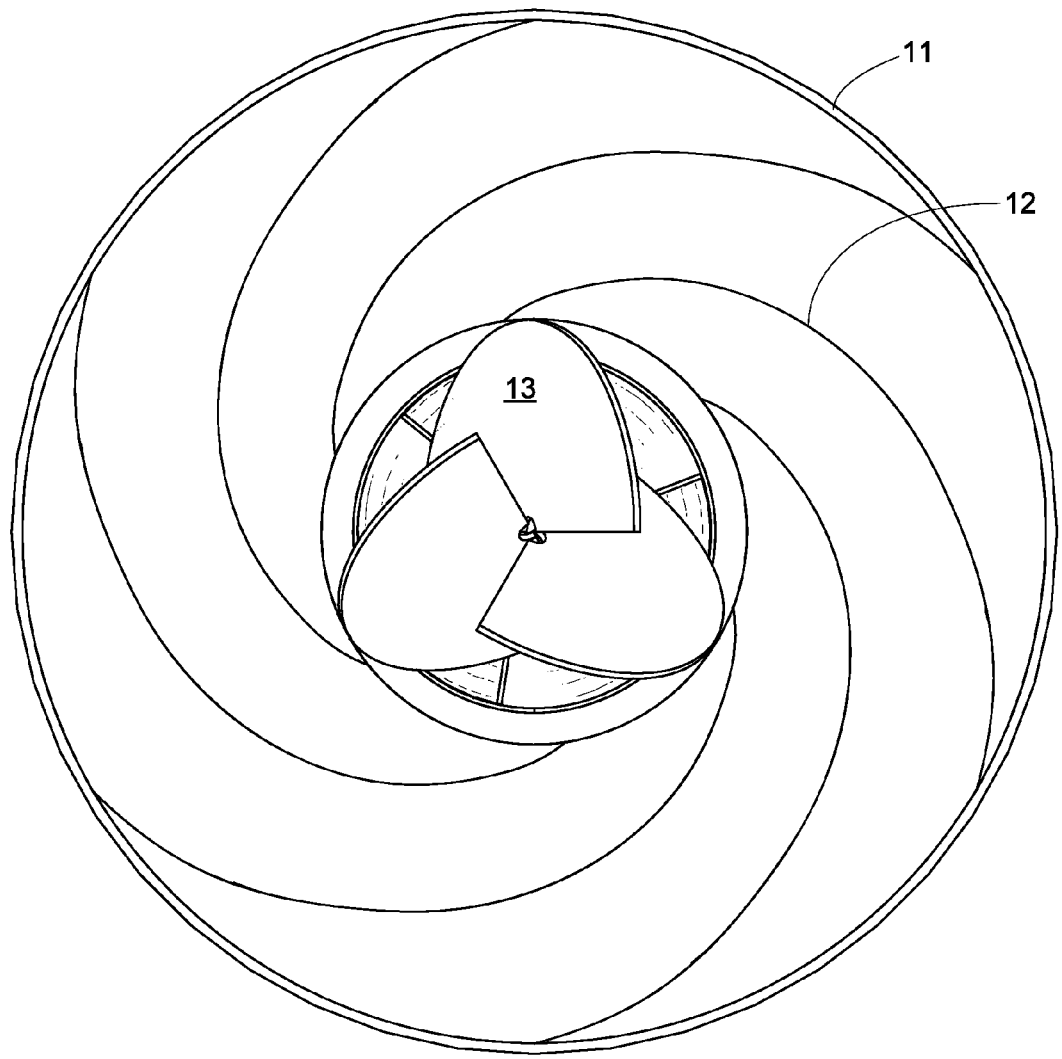
FIG. 2A depicts an elevation view of the upstream funnel end (or front end) of the invention of FIG. 1, with the pivot-plates of the throat-valve in an open configuration.
Figure 2B:
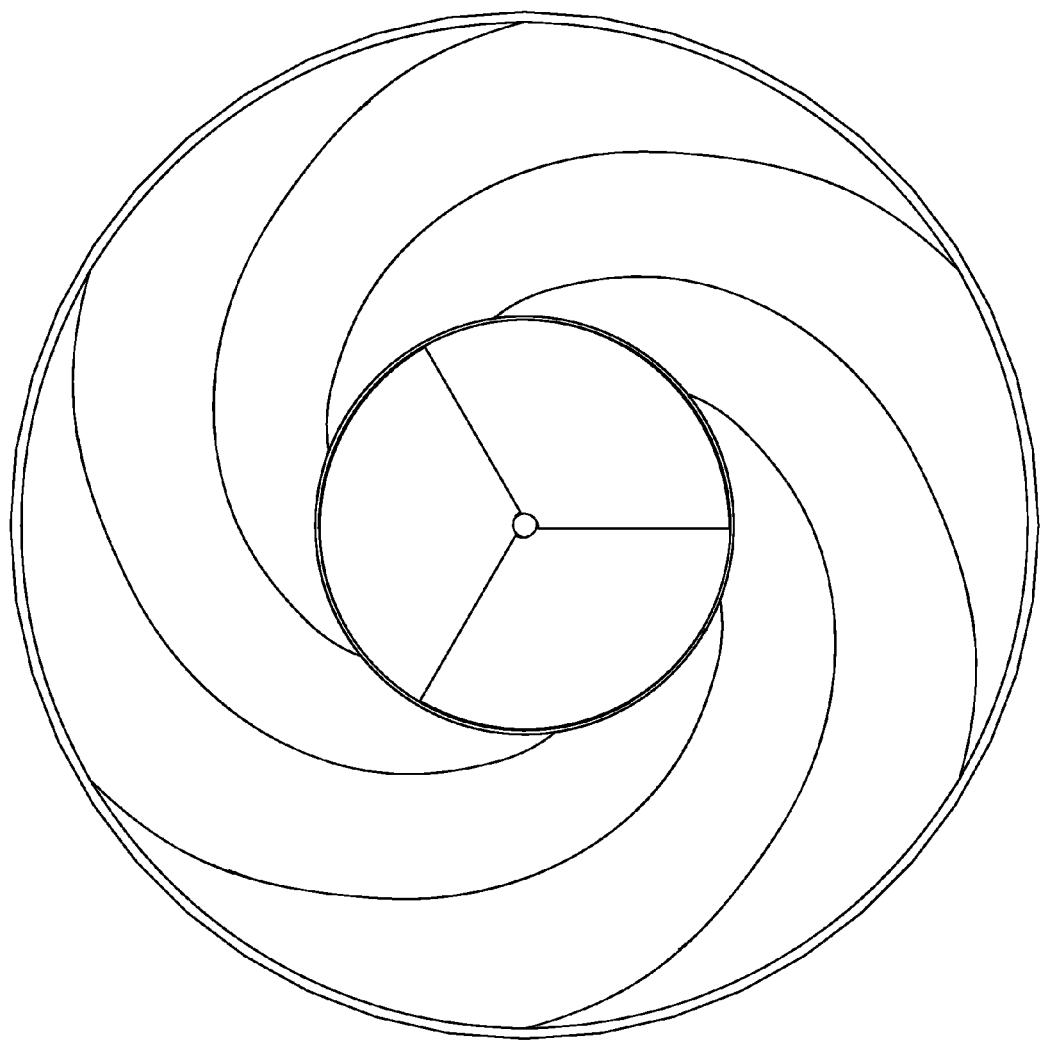
FIG. 2B depicts the pivot-plates of the throat-valve in a closed configuration.
Figure 3:
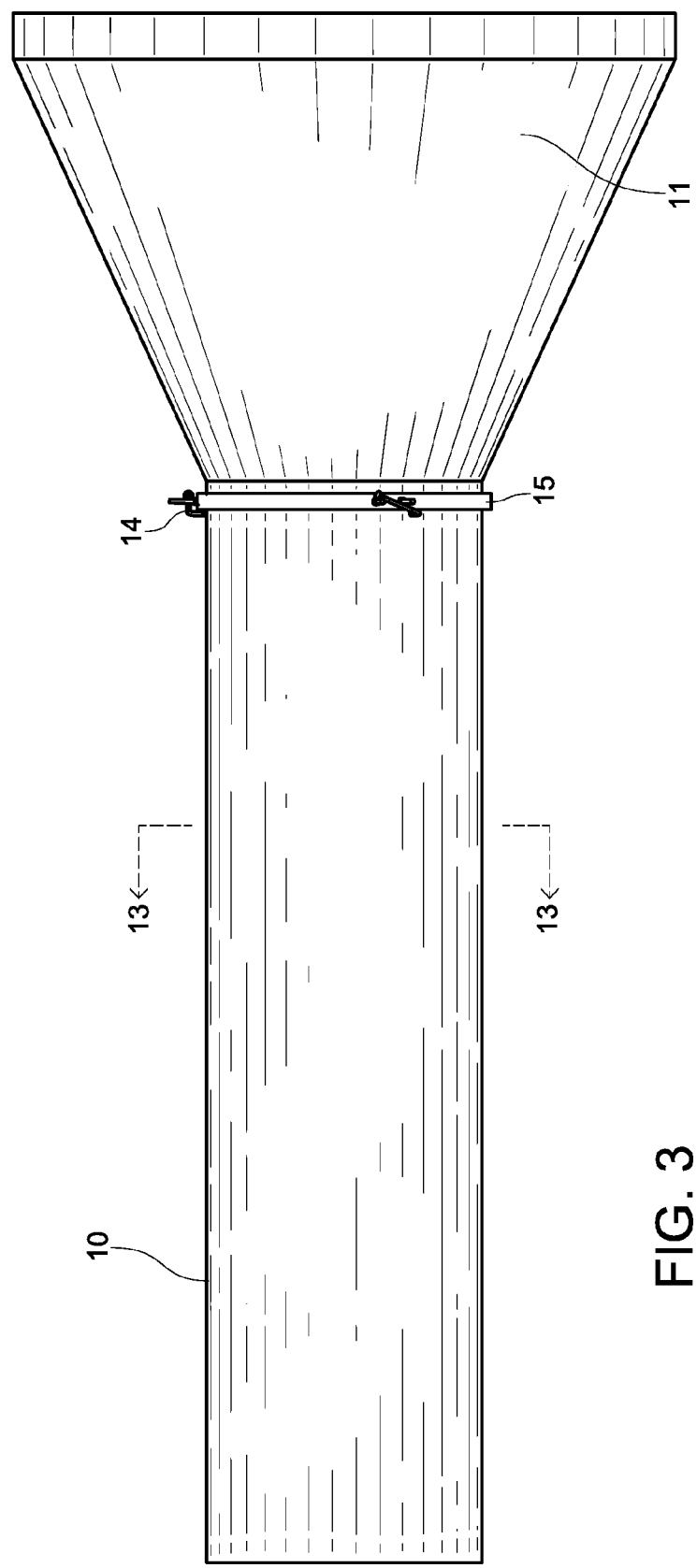
FIG. 3 depicts a bottom plan view of the invention of FIG. 1.
Figure 4A:
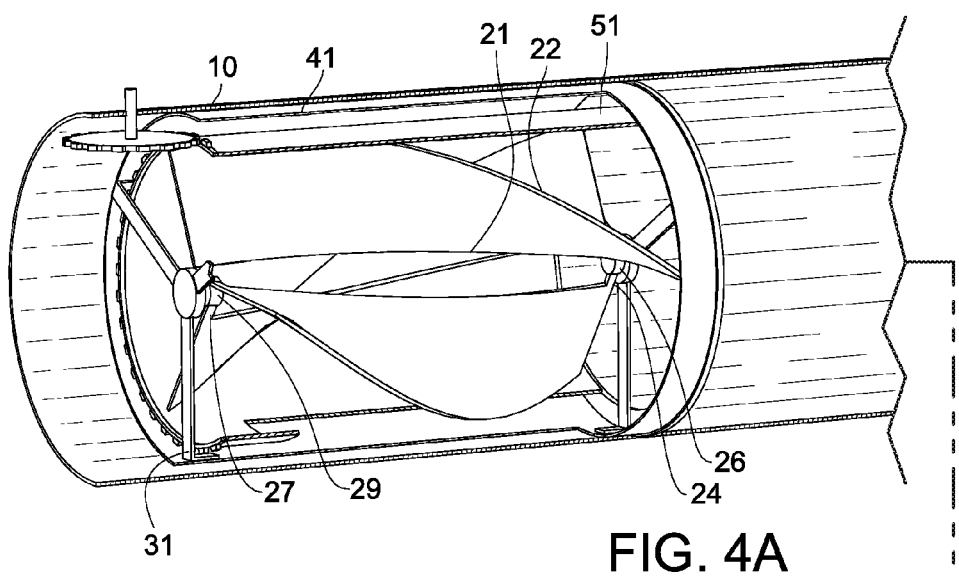
FIG. 4A depicts a partial cutaway perspective view of the turbine end of the invention of FIG. 1; portions of the housing (10), canister (41), sleeve (51) and strut (31) are removed to reveal the interior.
Figure 4B:
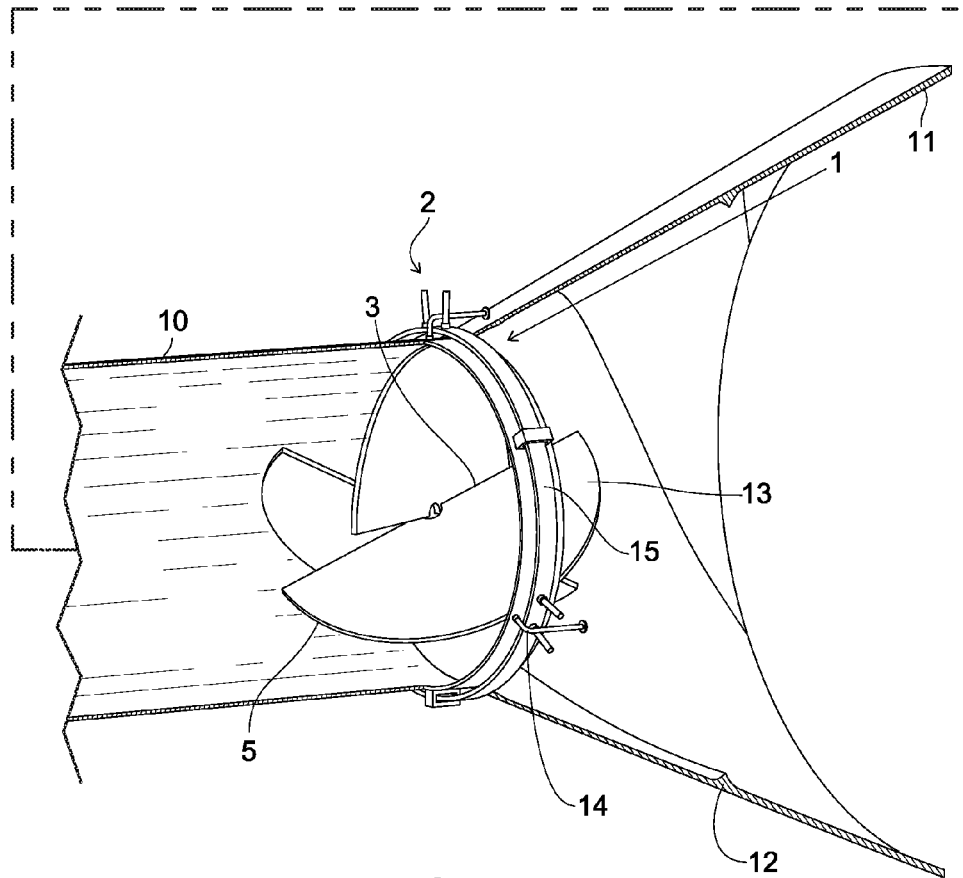
FIG. 4B depicts a partial cutaway perspective view of the funnel end of the invention of FIG. 1, immediately upstream and downstream of the throat (2); portions of the housing (10) and funnel housing portion (11) have been removed to reveal the pivot-plates (13) of the throat-valve, including a straight edge (3) and a circumferential edge (5); the arrow (1) along the upper wall of the funnel shows the constriction of that lumen.
Figure 5A:
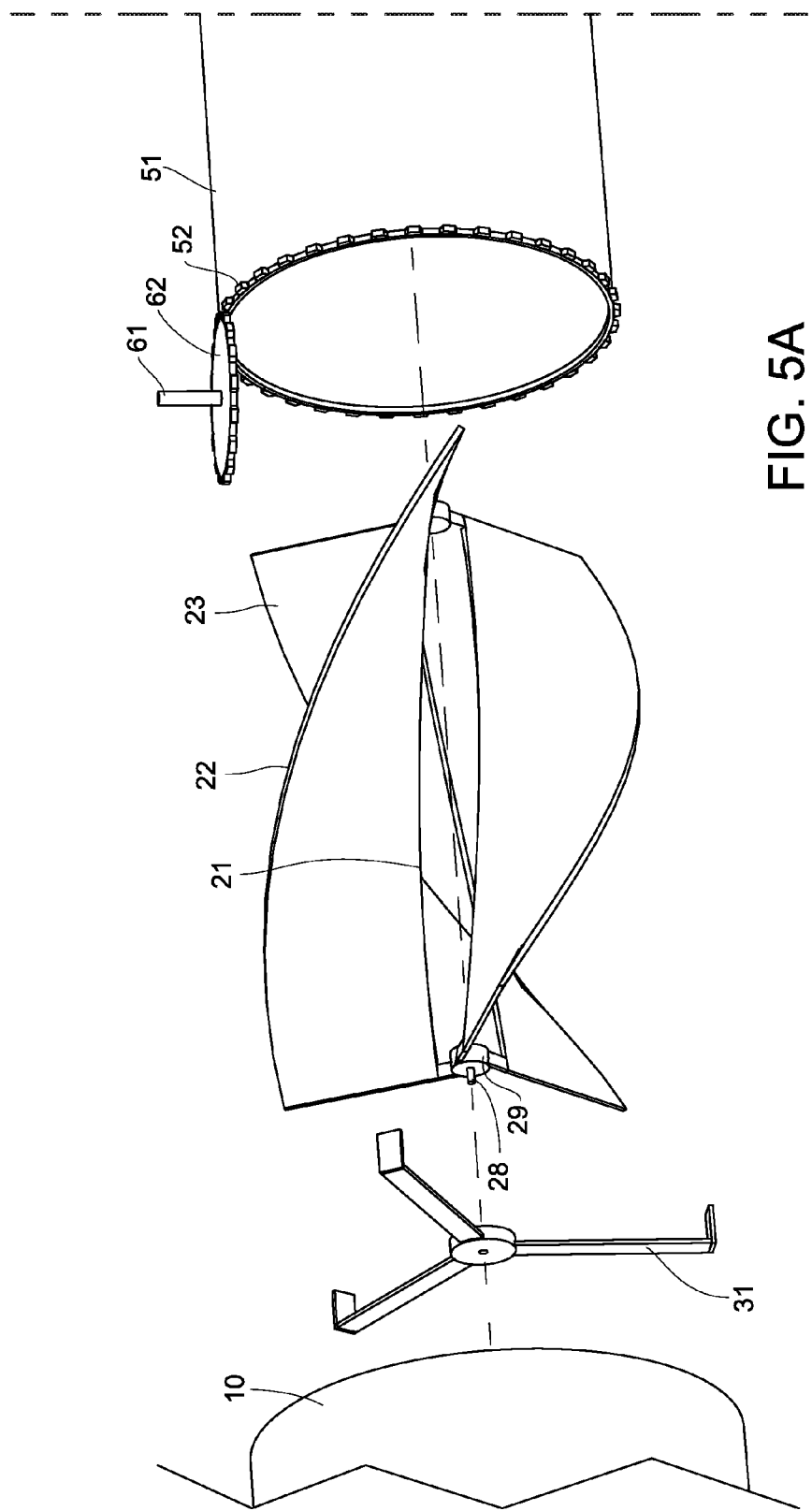
FIGS. 5A and 5B depict an exploded view of the primary structural elements starting, in FIG. 5A, with a portion of the housing (10) downstream of the funnel throat, radial struts (31), a blade assembly including an axle-tip (28), a downstream axle support bearing (29), and blades having an axial edge (21) and a peripheral edge (22) and a vortically curved primary face (23); also depicted in 5A is a downstream end portion of a sleeve (51) with cogged ring (52), together with a gearwheel (62) with a drive shaft (61) or bushing casing for a drive shaft.
Figure 5B:
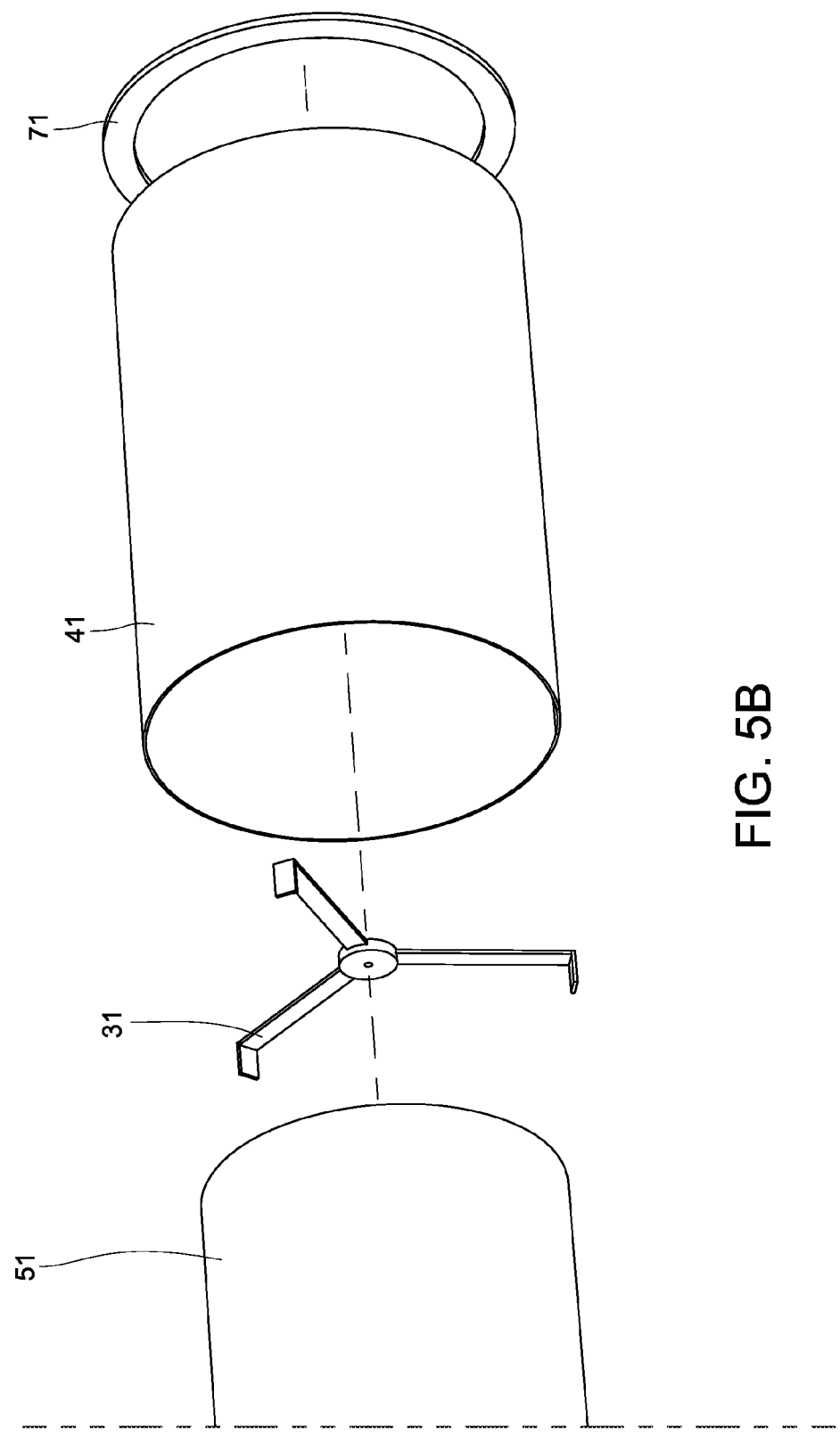
Figure 6:
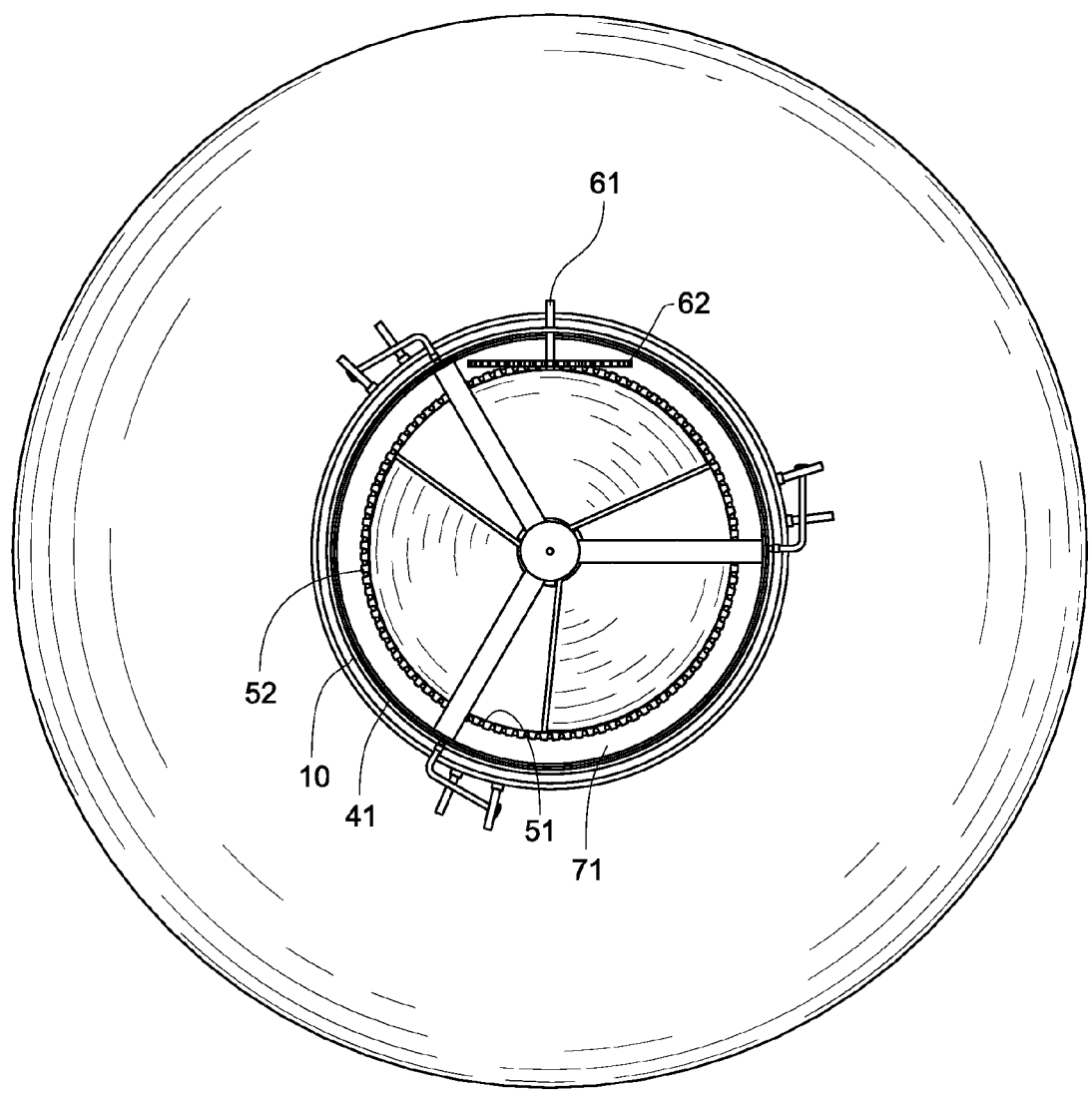
FIG. 6 depicts an elevation view of the downstream end of the invention of FIG. 4.
Figure 7:
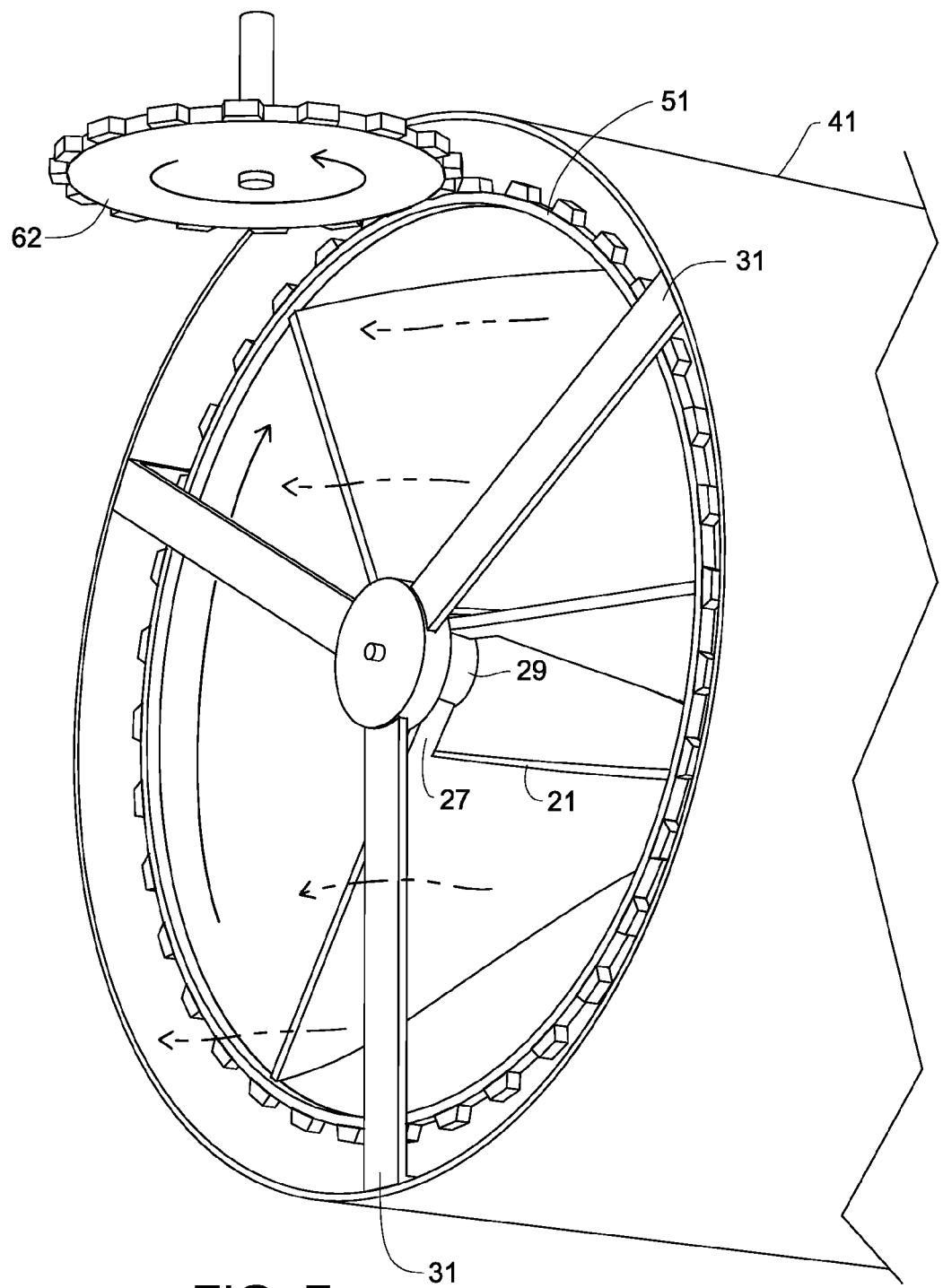
FIG. 7 depicts a close-up perspective view of a portion of the downstream end of a blade assembly within a sleeve (51) telescopically received within a canister (41), together with associated radial struts (31) and gearwheel (62).
Figure 8:
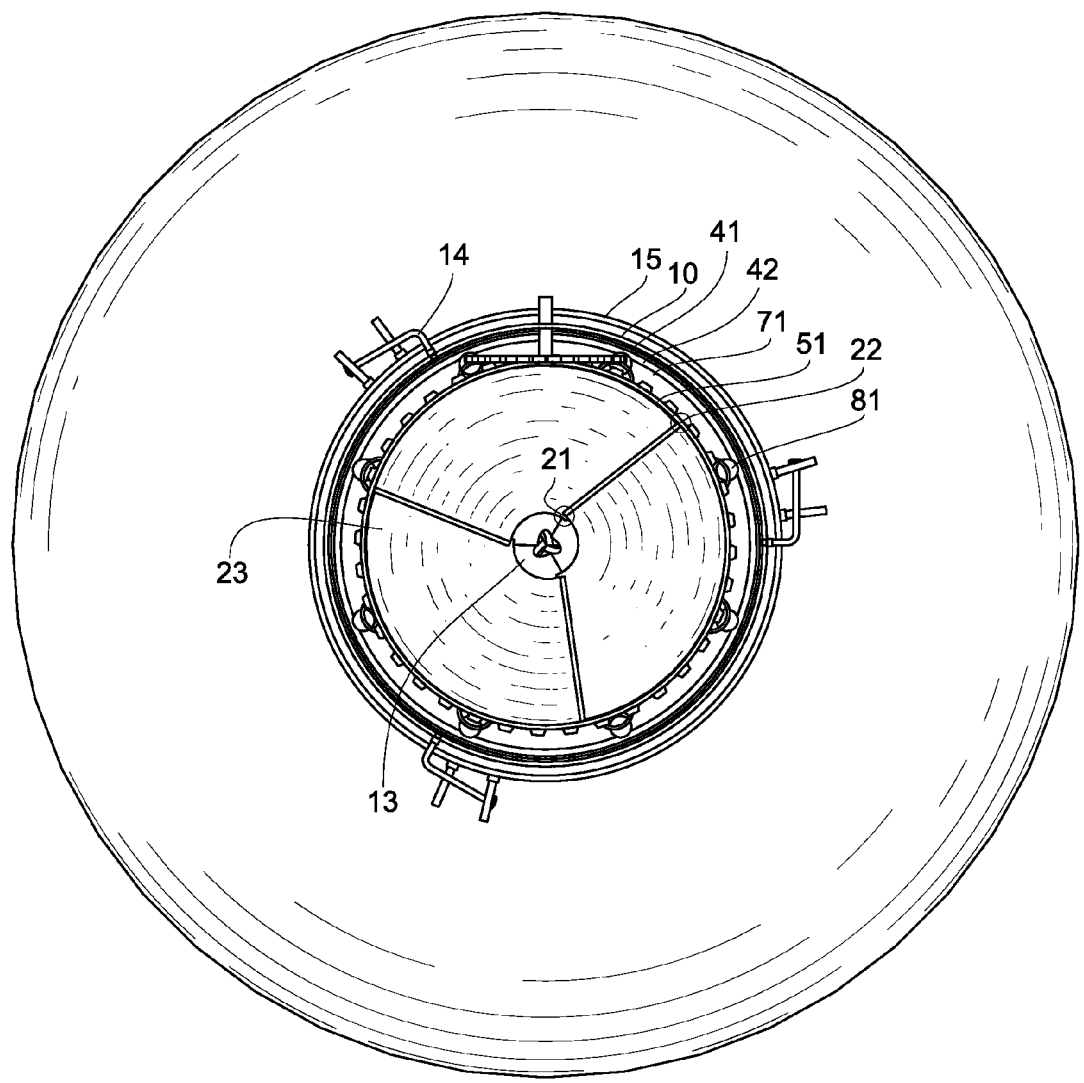
FIG. 8 depicts an elevation view of the downstream end of the invention of FIG. 9, an embodiment having no axle supporting the blades; it shows a portion of the throat-valve visible through the interior passageway formed by the inner axial edges of the blades.
Figure 9A:
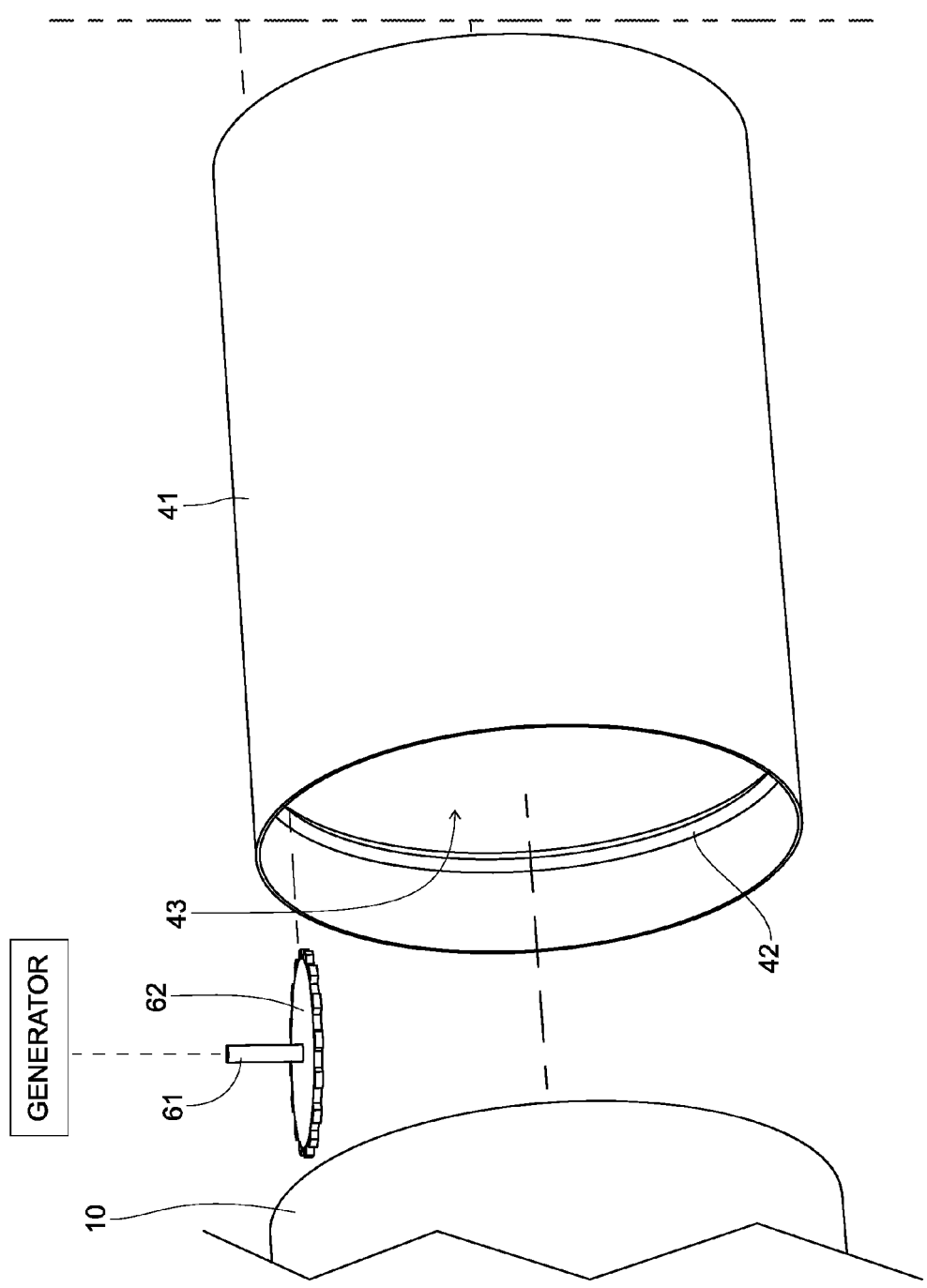
FIGS. 9A and 9B depict an exploded view of the primary structural elements of the turbine portion (50) of the system, primarily comprising the blades affixed within the sleeve (51) with the cogged ring (52), starting, in FIG. 9A, with a portion of the housing (10) downstream of the funnel throat), a gearwheel (62) with a drive shaft (61), and a canister (41) having a lumen (43) and including a rail-ring (42).
Figure 9B:
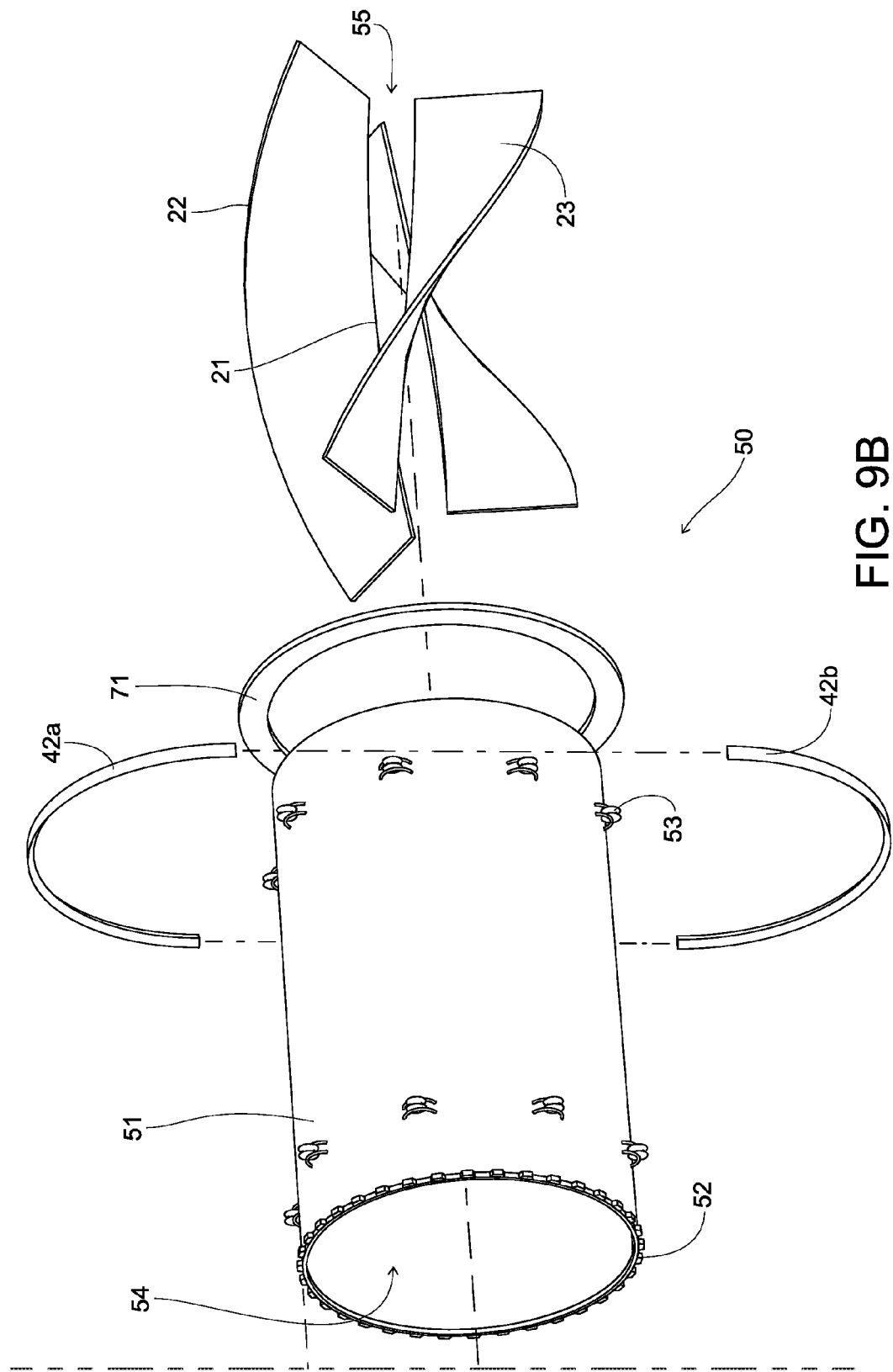
Figure 10:
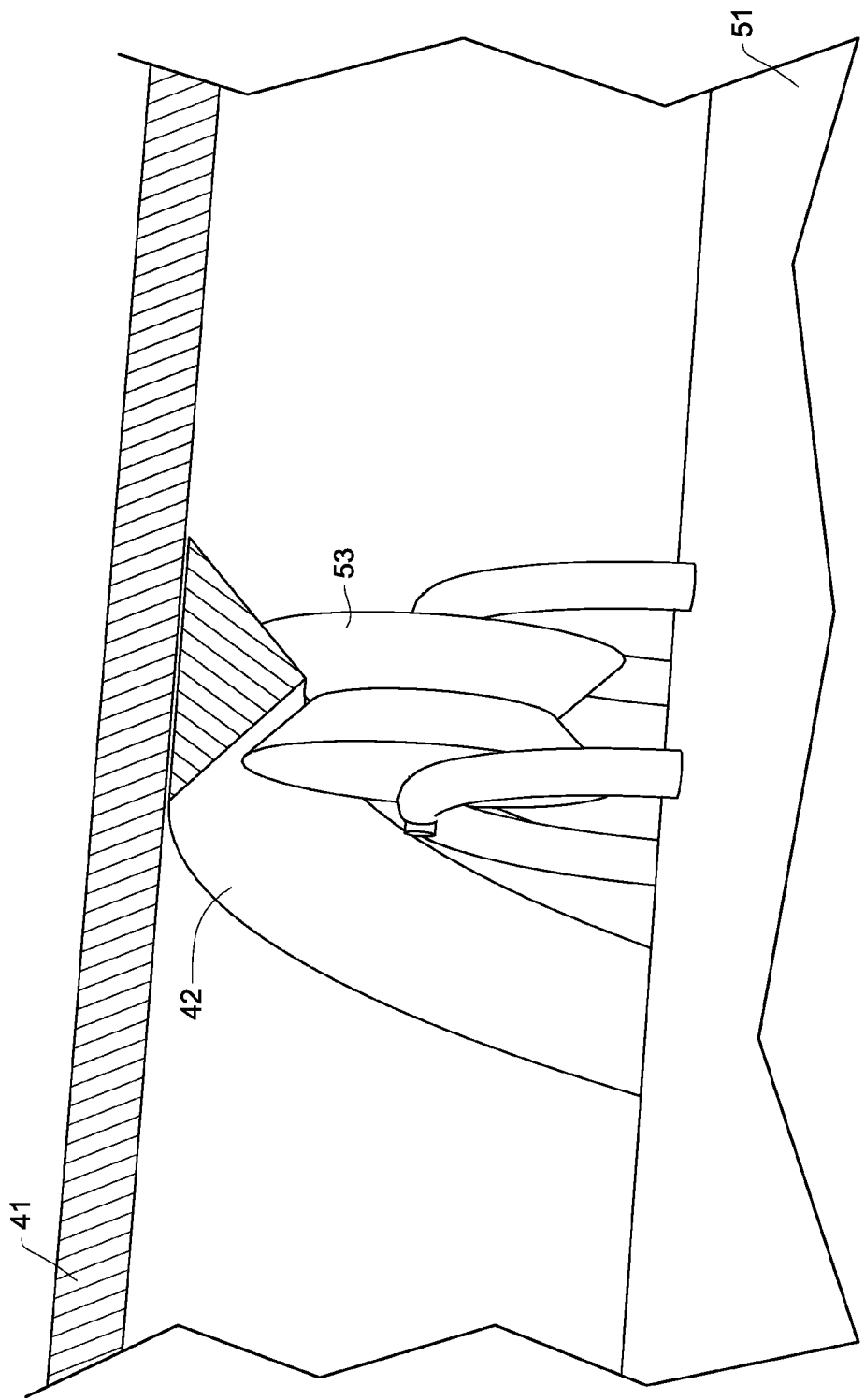
FIG. 10 is a cutaway depicting the interface of a rail-ring (42) and a rail-riding wheel (53).
Figure 11A:
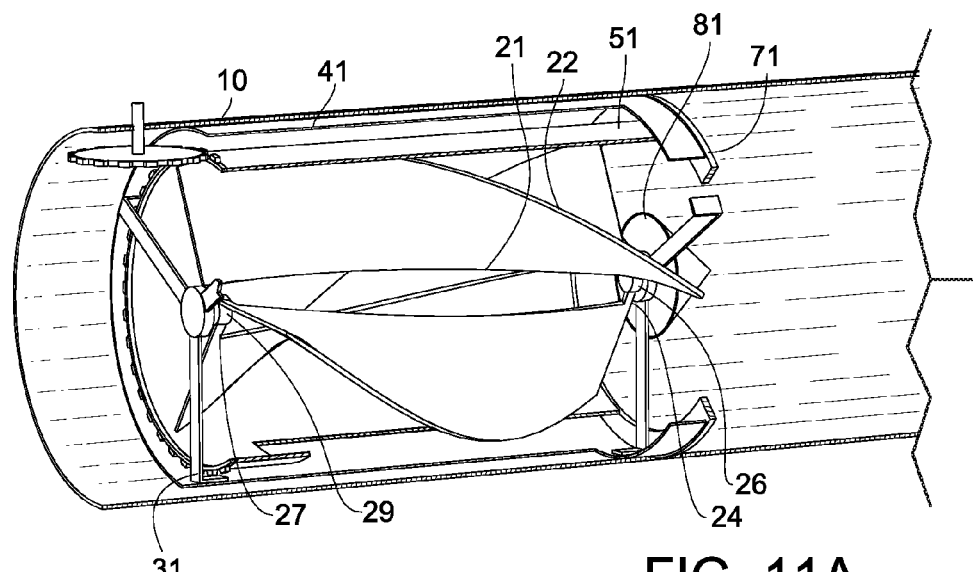
FIG. 11A depicts a partial cutaway perspective view of the turbine end of another embodiment of the invention; portions of the housing (10), canister (41), sleeve (51) and strut (31) are removed to reveal the interior, including a cone (81) having its apex pointing upstream within the water flow.
Figure 11B:
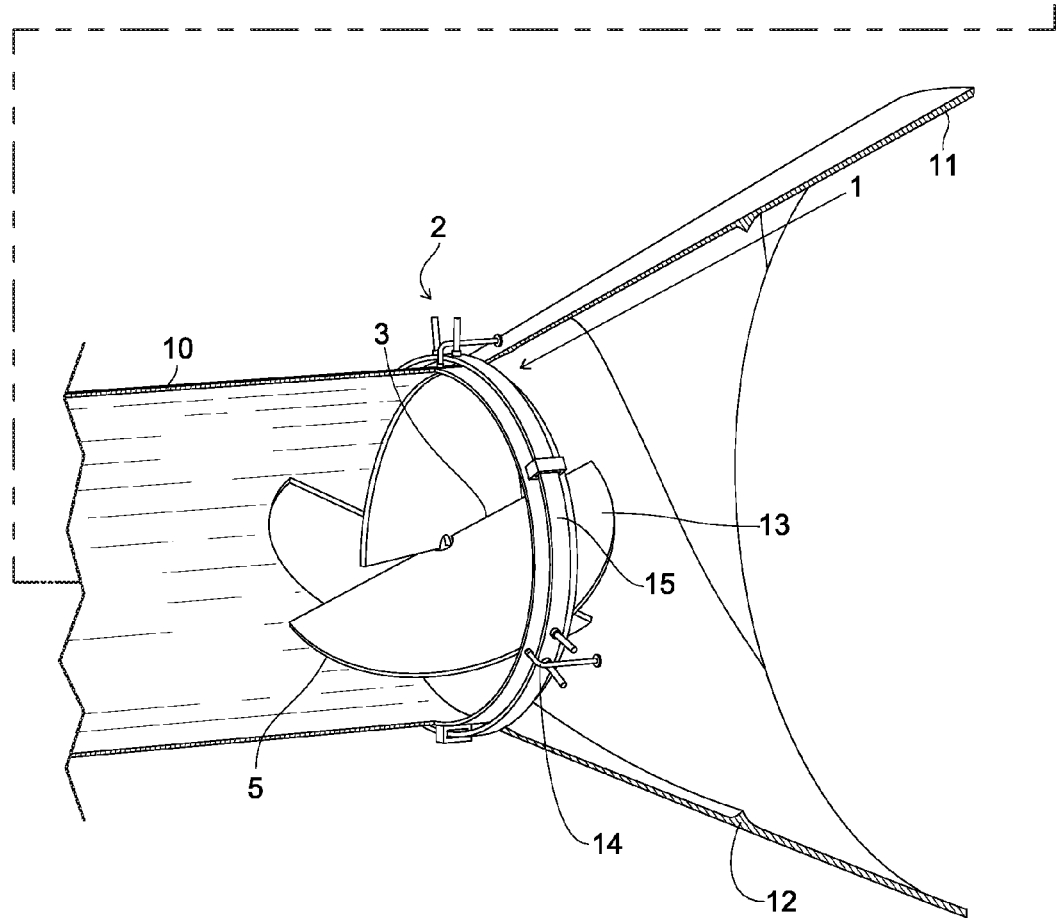
FIG. 11B depicts a partial cutaway perspective view of the funnel end of the invention of FIG. 11A, immediately upstream and downstream of the throat (2); portions of the housing (10) and funnel housing (11) have been removed to reveal the pivot-plates (13) of the throat-valve, including a straight edge (3) and a circumferential edge (5); the arrow (1) along the upper wall of the funnel shows the constriction of that lumen.
Figure 12A:
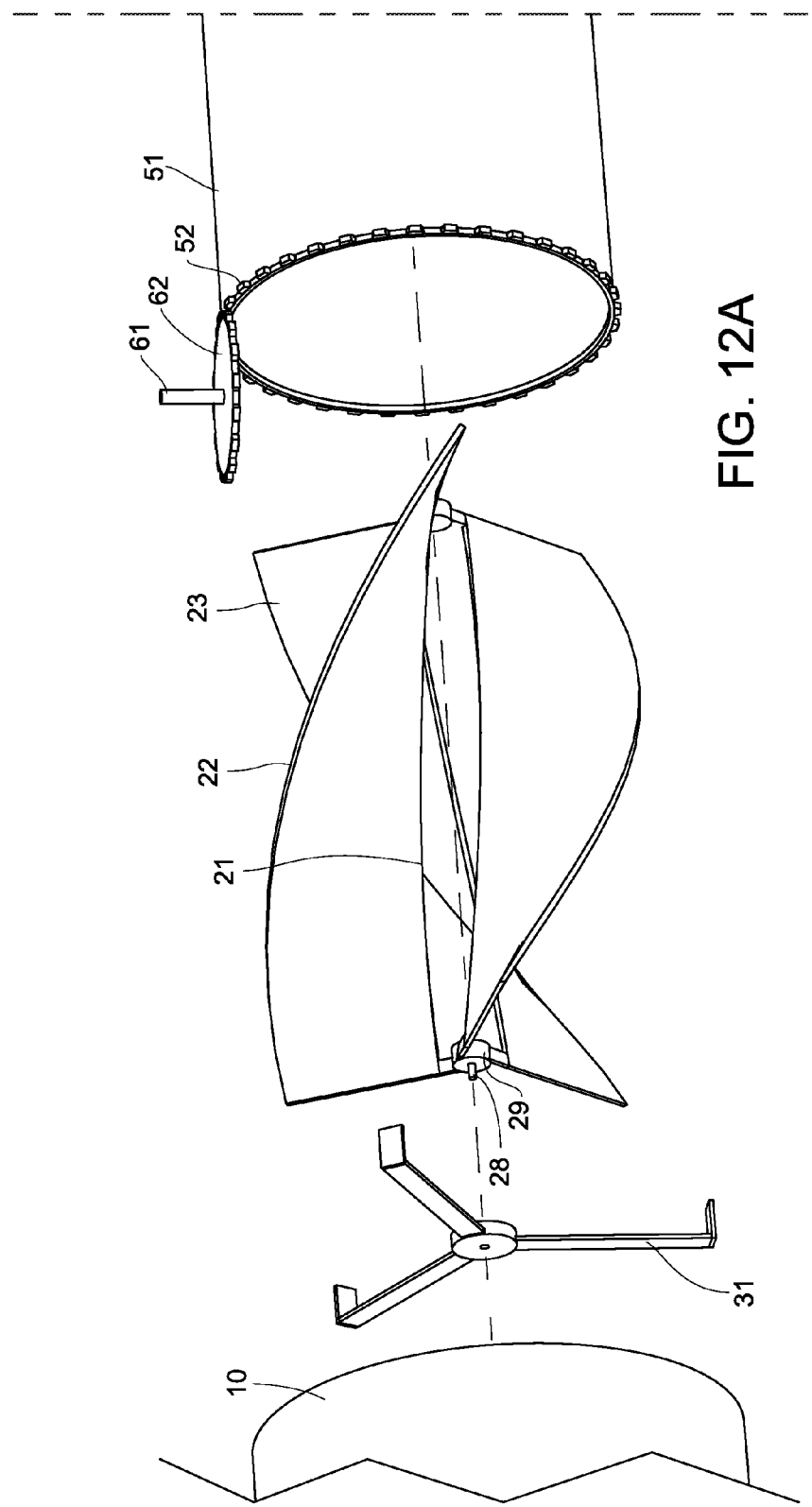
FIGS. 12A and 12B depict an exploded view of the primary structural elements starting, in FIG. 12A, with a portion of the housing (10) downstream of the funnel throat, radial struts (31), a blade assembly including an axle-tip (28), a downstream axle support bearing (29), and blades having an axial edge (21) and a peripheral edge (22) and a vortically curved primary face (23); also depicted in 12A is a downstream end portion of a sleeve (51) with cogged ring (52), together with a gearwheel (62) with a drive shaft (61) or bushing casing for a drive shaft.
Figure 12B:
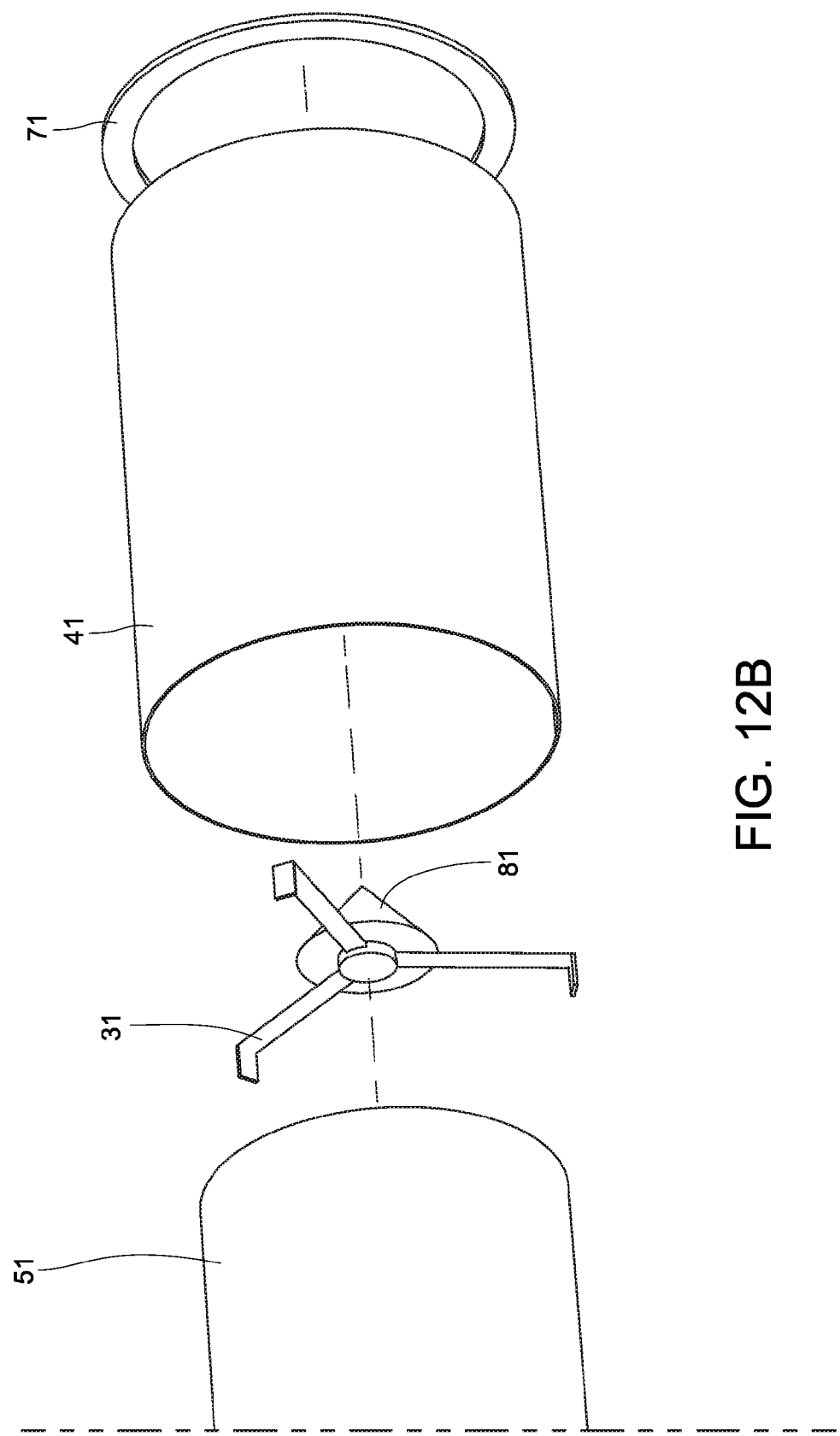
Figure 13:
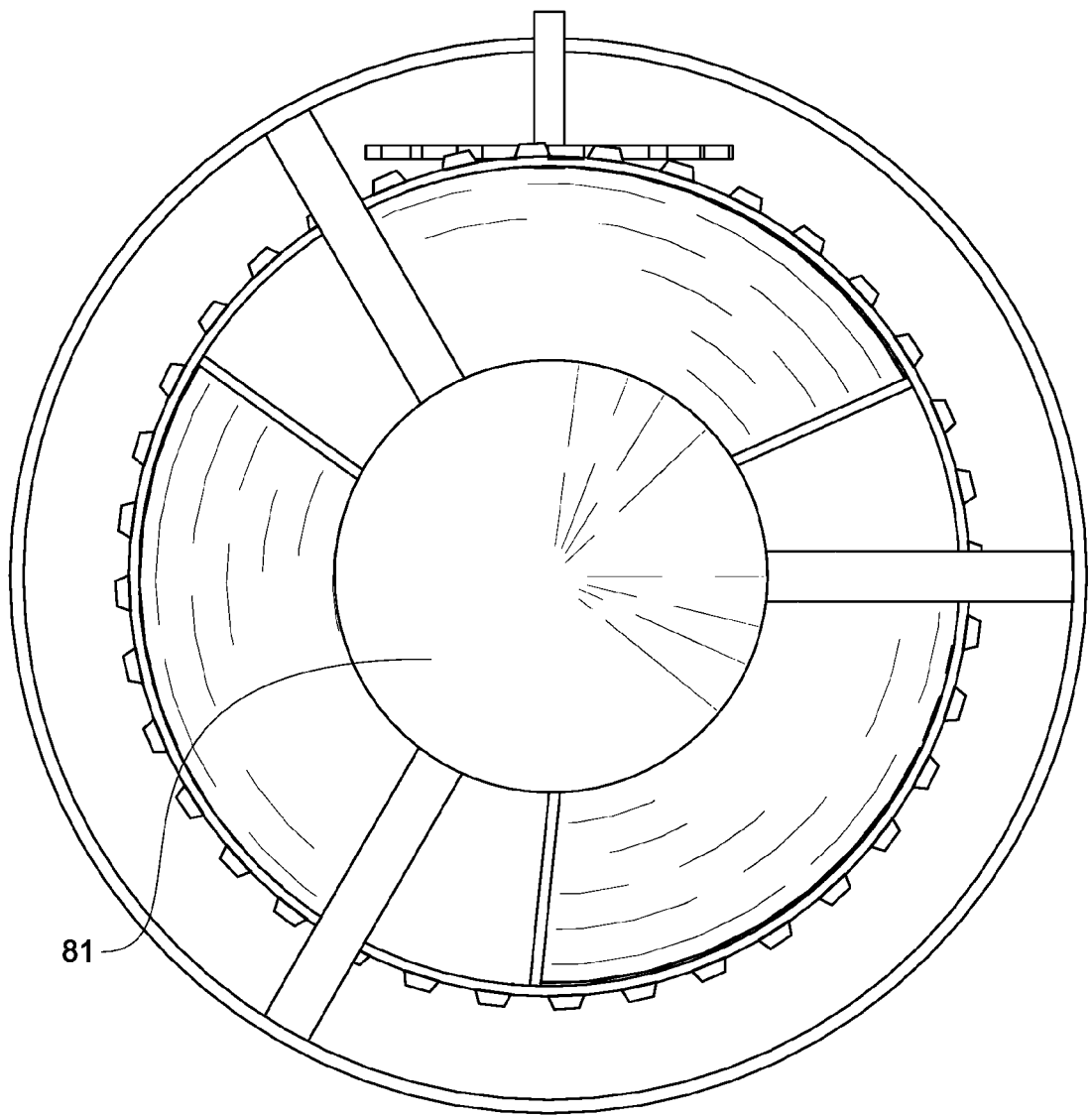
FIG. 13 depicts a cross-section view at plane 13-13 of FIG. 3, for an embodiment including a cone.
Figure 14A:
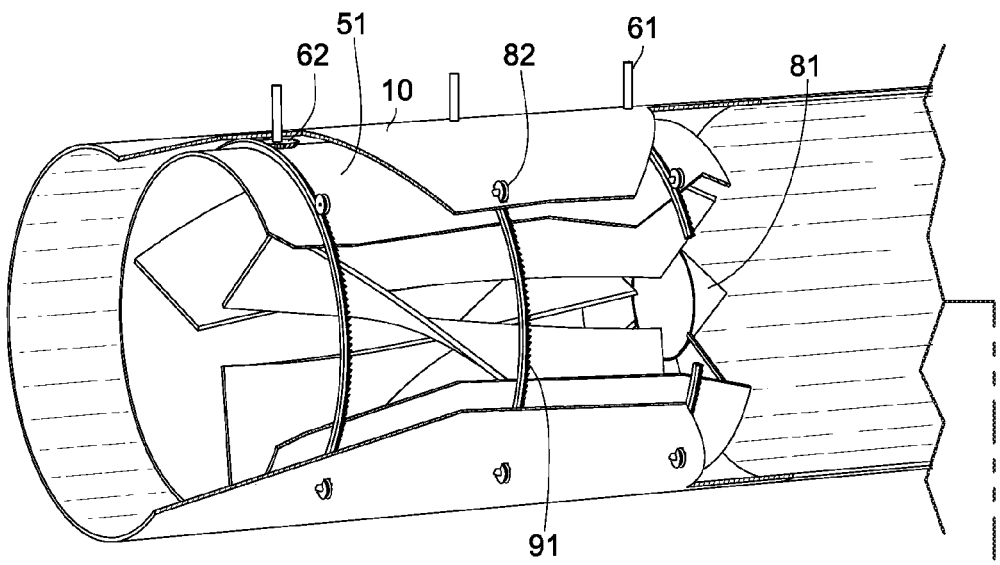
FIG. 14A depicts a partial cutaway perspective view of the turbine end of another embodiment of the invention; portions of the housing (10), sleeve (51), strut (31), and sleeve-encircling rail-ring (91) are removed to reveal the interior, including a cone (81) having its apex pointing upstream within the water flow.
Figure 14B:
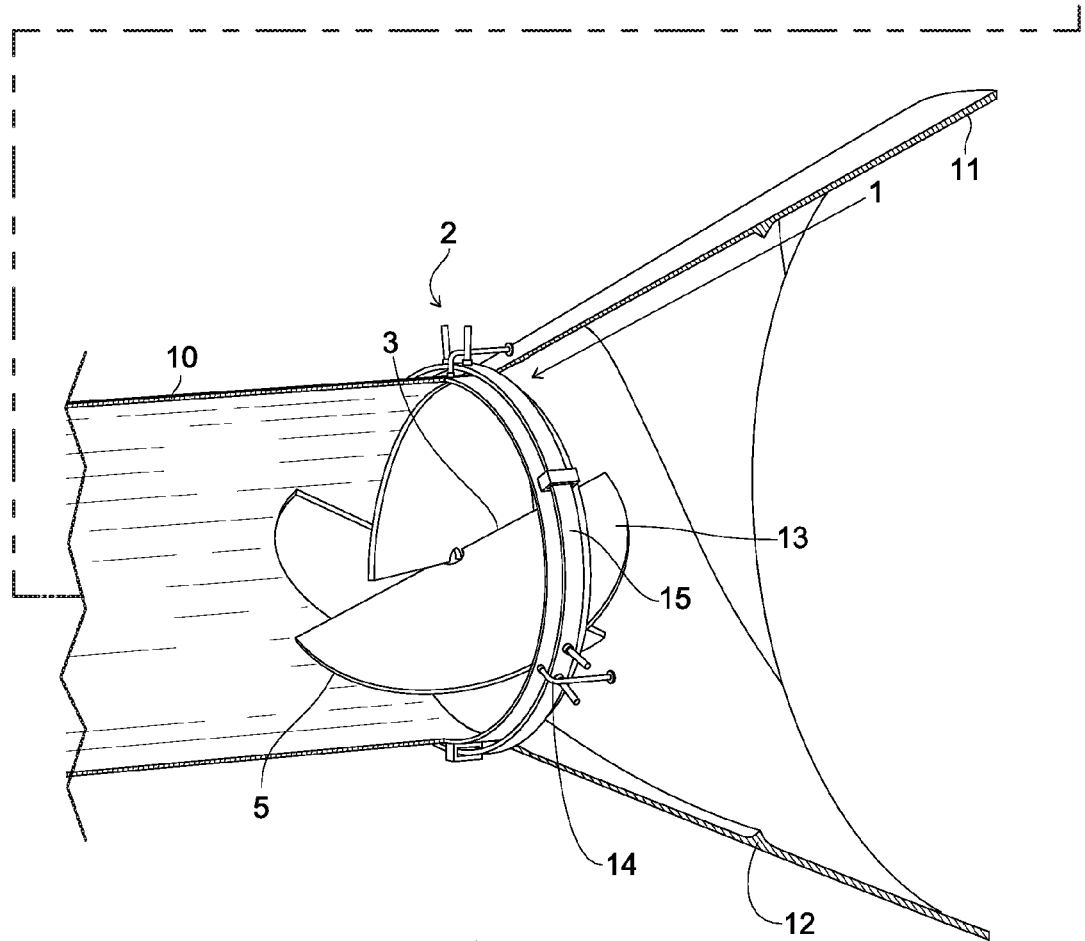
FIG. 14B depicts a partial cutaway perspective view of the funnel end of the invention of FIG. 14A, immediately upstream and downstream of the throat (2); portions of the housing (10) and funnel housing (11) have been removed to reveal the pivot-plates (13) of the throat-valve, including a straight edge (3) and a circumferential edge (5); the arrow (1) along the upper wall of the funnel shows the constriction of that lumen.
Figure 16:
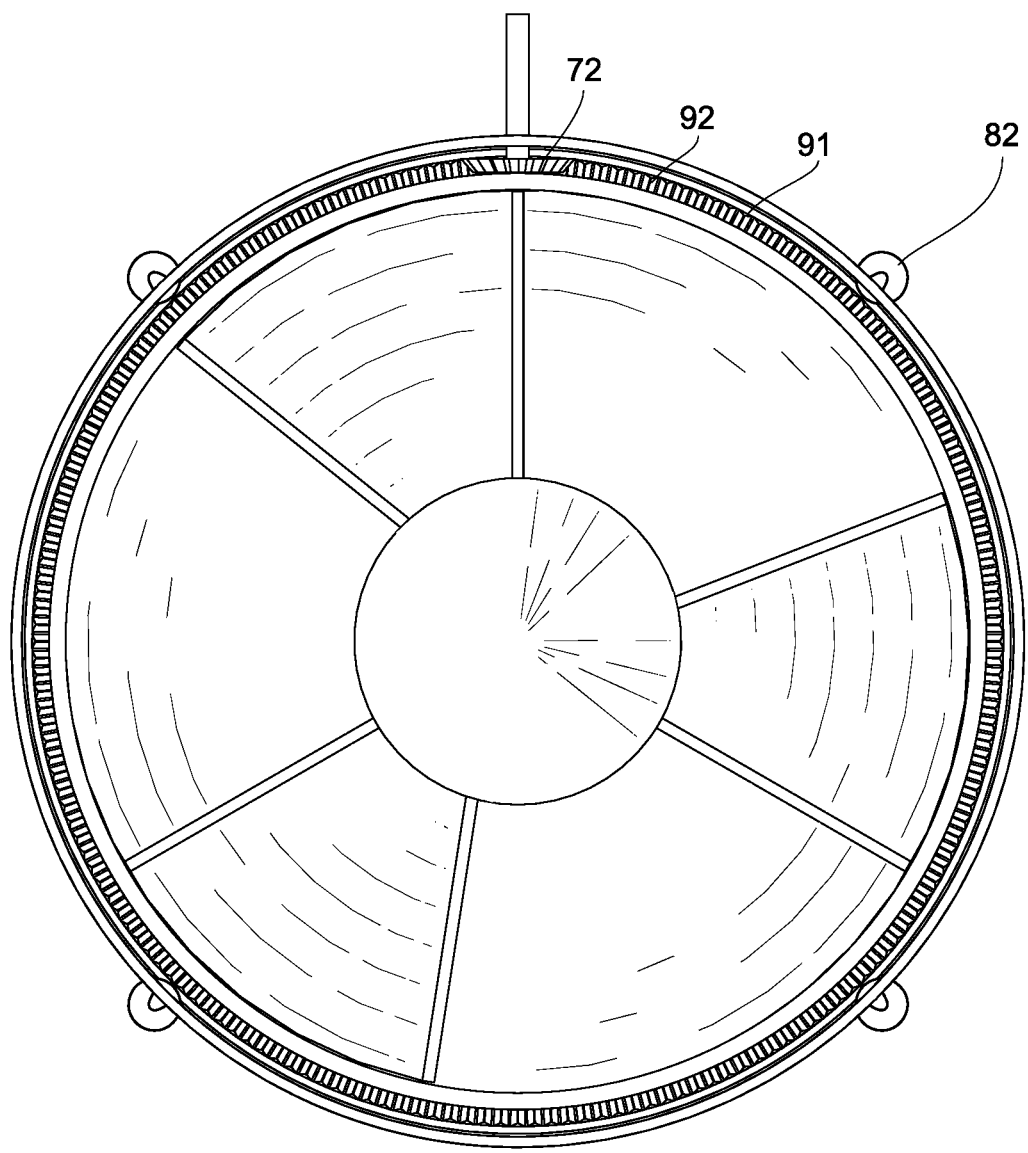
FIG. 16 depicts a cross-section view at plane 16-16 of FIG. 15, for an axle-less embodiment including a cone.

The terminology used herein is for the purpose of describing particular embodiments only, and is not intended to be limiting. As used herein, the singular forms "a", "an", and "the" are intended to include the plural forms as well, unless the context clearly indicates otherwise. It will be further understood that the terms "comprises" and/or "comprising" or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

For the sake of simplicity and to give the claims of this patent application the broadest interpretation and construction possible, the conjunctive "and" may also be taken to include the disjunctive "or," and vice versa, whenever necessary to give the claims of this patent application the broadest interpretation and construction possible. Likewise, when the plural form is used, it may be taken to include the singular form, and vice versa.

It will be understood that, although the terms first, second, third, etc. may be used herein to describe various elements, these elements should not be limited by these terms. These terms are only used to distinguish one element from another element.

The disclosure herein is not limited by construction material(s) to the extent that such materials satisfy the structural and/or functional requirements. For example, any material may be used so long as it satisfies the rigid and/or durable structural and functional requirements for which it is being used.

It is an object of the present invention to provide a turbine apparatus for a hydro-electric generator system maximizing the power of current flow and fluid dynamics to optimize the force applied to turbine blades.

Another object of the invention is to provide a turbine apparatus for a hydro-electric generator system that can be deployed without a dam.

Another object of the invention is to provide a turbine apparatus for a hydro-electric generator system using a single current flow to rotate the blades of a plurality of turbines.

Other objects of the invention will become clear upon a review of the disclosure herein.

In general, the invention disclosed herein comprises (includes) a hydro-electric generator system comprising an upstream funnel housing defining a constricting horizontal lumen (1) defined by the inner wall of the funnel, initiating vortical movement of water into a throat and throat-valve which, when in an open configuration, enhances the vortical movement of water through a second constricting lumen within the housing, directing water vortex to a plurality of blades of a turbine for rotational force. The funnel (11) may have an inner surface including a vortical ridge, flange or land (12) upstream of the throat-valve. For embodiments in which the turbine blades rotate around an axle, the funnel opening may include screening preventing entry of sizeable debris and/or waterlife into the system.

The throat-valve preferably includes a plurality of pivot-plates (13), and includes a coordination means for coordinating the opening and closing of the pivot-plates.

Each of the pivot-plates may have an essentially half-disc configuration including a straight-edge and a circumferential edge which, when in a closed configuration, mimics the nearby contour of the lumen wall of the funnel throat. Each plate pivots on a pivot-pin (14) extending from the circumferential edge through the housing. In one preferred embodiment, the plurality of pivot-plates form a triad of essentially half-disc pivot-plates; each plate may have a notch near the mid-point of its straight-edge for pivoting coordination with the corresponding nearby notches of the other pivot-plates of the throat-valve, the notch of each pivot-plate being maintained in coordinating proximity to the notch of the second and third other pivot-plates. In overlapping fashion, a portion of the first mentioned pivot-plate may be situated upstream of a portion of the second other pivot-plate while the remaining portion of the first mentioned pivot-plate is situated downstream of a corresponding portion of the third other pivot-plate.

The coordination means may be any means for coordinating the opening and closing of the pivot plates, such as electronically controlled activation of solenoids (not shown) or similar known bi-directional control mechanisms. Another control means includes an outer collar (15) encircling the funnel throat; each of the pivot-plate pivot-pins may have an exterior end yoked to the collar, the rotation of the collar around the funnel throat causing coordinated pivoting of all pivot-plates for opening or closing the throat-valve.

The invention may also include a cone affixed within the housing lumen immediately upstream of the turbine and having its apex pointing upstream within the water flow. The base of the cone ideally is a sufficient distance from the housing to allow the water flow to more quickly flow between the base and the housing. One primary purpose of the cone is to shunt or focus water flow outwardly toward the periphery of the housing lumen, thereby forcing the water flow into and through a smaller pathway. The cone may be anchored within the water flow in any manner possible. For example, if there are struts anchoring axles or axle-tips of a turbine, the base of the cone may be anchored to one or more of such struts. Another manner of anchoring the cone may include struts extending from the cone outwardly to the housing.

Each of the blades may include a peripheral edge (22), an axial edge (21), and an essentially vortically curved primary face (23) between the edges, the entire upstream-to-downstream length of which receives force from the movement of the water vortex through the housing lumen. This causes the blades to rotate along an axis essentially central through the housing lumen. In one embodiment of the invention, each of the blades may have an upstream axial corner region (24) anchored to an axle-tip (25) carried by an upstream axial support bearing (26) shared by all of the blades. Each of the blades may also have a downstream axial corner region (27) anchored to an axle-tip (28) carried by a downstream axial support bearing (29) shared by all of the blades. In one embodiment, there is a 120 degree difference between the attachment of the upstream end or edge and the attachment of the downstream end or edge; in other words, the blade's curvature is accomplished from its upstream edge to its downstream edge, with a twist of about ⅓ of the 360 degree circumference of the axis. Each of the axial bearings may be mounted at the convergence of a plurality of radial struts (31) anchored within the housing. Accordingly, the blades will rotate around an axle, but with the center portion of the axle removed so that the rotation is around a pair of axle-tips.

In another embodiment, each of the axial bearings may be mounted at the convergence of a plurality of radial struts anchored within a canister (41) telescopically received within the housing (10). The peripheral edges of the blades may also be anchored to the interior wall of the canister. Alternatively, the peripheral edges of the blades may be anchored to the interior wall of a sleeve (51) telescopically received within the canister.

The system involves translating rotation of the turbine blades into rotation within an electricity generator. Several mechanisms will achieve that. The invention disclosed herein may further include a cogged ring (52) encircling the canister or the sleeve, whichever is rotary. The system may further include a gearwheel (62) having teeth meshing with the cogs, the gearwheel rotating a drive shaft (61) extending through the housing and rotating an electric generator. Ideally the drive shaft will be protected and/or journaled by a cylindrical casing or bushing. In this manner, rotation of the turbine blades around an axis that is essentially horizontal (whether a true axle, or axle-tips disclosed herein, or the axle-less version disclosed herein) can be translated into rotation of a drive shaft in a different plane. Other mechanisms for translating rotary motion from one plane to another includes perpendicular axis gears such as Zerol gearing (72), spiral bevel gearing, worm gearing and other forms of perpendicular rotational transfer gearing (not shown).

Constriction of the lumen is important for increasing the force of the water current within the housing, since forcing a steady stream of water through a smaller opening increases its velocity and therefore force. The second constricting lumen may further include an annular convergence collar shunting water axially away from any space between the canister and the sleeve.

On preferred embodiment of the hydro-electric generator system includes a turbine comprising a plurality of turbines aligned sequentially within the housing.

One axle-less embodiment of the hydro-electric generator system includes a turbine comprising a sleeve telescopically received within the housing lumen, which may have an inner surface supporting a plurality of blades; each blade may have a peripheral edge anchored to the sleeve, an axial edge a short distance from the lumen axis, and an essentially vortically curved primary face between the edges. The entire upstream-to-downstream length of each blade receives force from the movement of the water vortex through the lumen, causing the blades to rotate along an axis essentially central through the lumen but without obstructing the lumen axis.

Also included is an axle-less means governing sleeve rotation around the lumen axis. In one embodiment, the means governing sleeve rotation comprises a canister telescopically received within the housing, and includes a rail-ring encircling the canister lumen; the sleeve is telescopically received within the canister; and includes at least three rail-riding wheels mounted around the circumference in cooperating alignment with the rail-ring. In one embodiment, each wheel is impaled on an axle-let supported by archways or similar support anchored to the circumference of the sleeve. The archways may be flexible in one direction, to allow sufficient movement for installing the axled wheel while maintaining sufficient support for the wheel.

The system may further include a cogged ring encircling the sleeve, together with a gearwheel having teeth meshing with the cogs. The gearwheel rotates a drive shaft extending through the housing, which rotates an electric generator.

As with the axled embodiment of the invention, the axle-less embodiment may include a plurality of canisters/sleeves aligned sequentially in the housing.

Although the vortical motion of the water moving through the primary embodiment is counterclockwise (looking from the upstream end toward the downstream end), the configuration of the elements of the invention may be arranged to impart and enhance clockwise vortical motion.

Ideally the further constricting lumen prevents the flow of water current through any space between the housing and the turbine blades (or the cassette carrying the blades).

Ideally all of the water current is focused toward the axial portion of the lumen, to increase the force of the water current upon the blades.

Although the blades may be of whatever construction that will rotate when water current moves downstream over the length of the blades, the primary embodiments disclosed herein have blades that curve 120 degrees from the upstream edge until the downstream edge.

When the turbine blades are connected to an axle, it may be necessary or desirable that the upstream funnel opening include a means of preventing the entry of debris, fish and other sizeable life forms.

Another preferred embodiment of the invention disclosed herein includes (comprises) an apparatus wherein the means for governing blade rotation includes the turbine including a sleeve telescopically received within the housing and having an inner surface connected to and supporting the plurality of blades. Each blade has an outer peripheral edge anchored to the sleeve, and has an inner axial edge separated by a short distance from the lumen axis such that an interior passageway is formed about the lumen axis by the inner axial edges of the plurality of blades. Each blade has a vortically curved primary face between the peripheral edge and the axial edge.

The sleeve further includes at least one rail-ring encircling the sleeve. Each essentially parallel rail-ring includes a base portion including cogs, essentially periodically-spaced gear-teeth cutouts. Preferably, each of the rail-rings has a base anchored to the sleeve, and has an upstream side and a downstream side and an apex therebetween.

Figure 17:
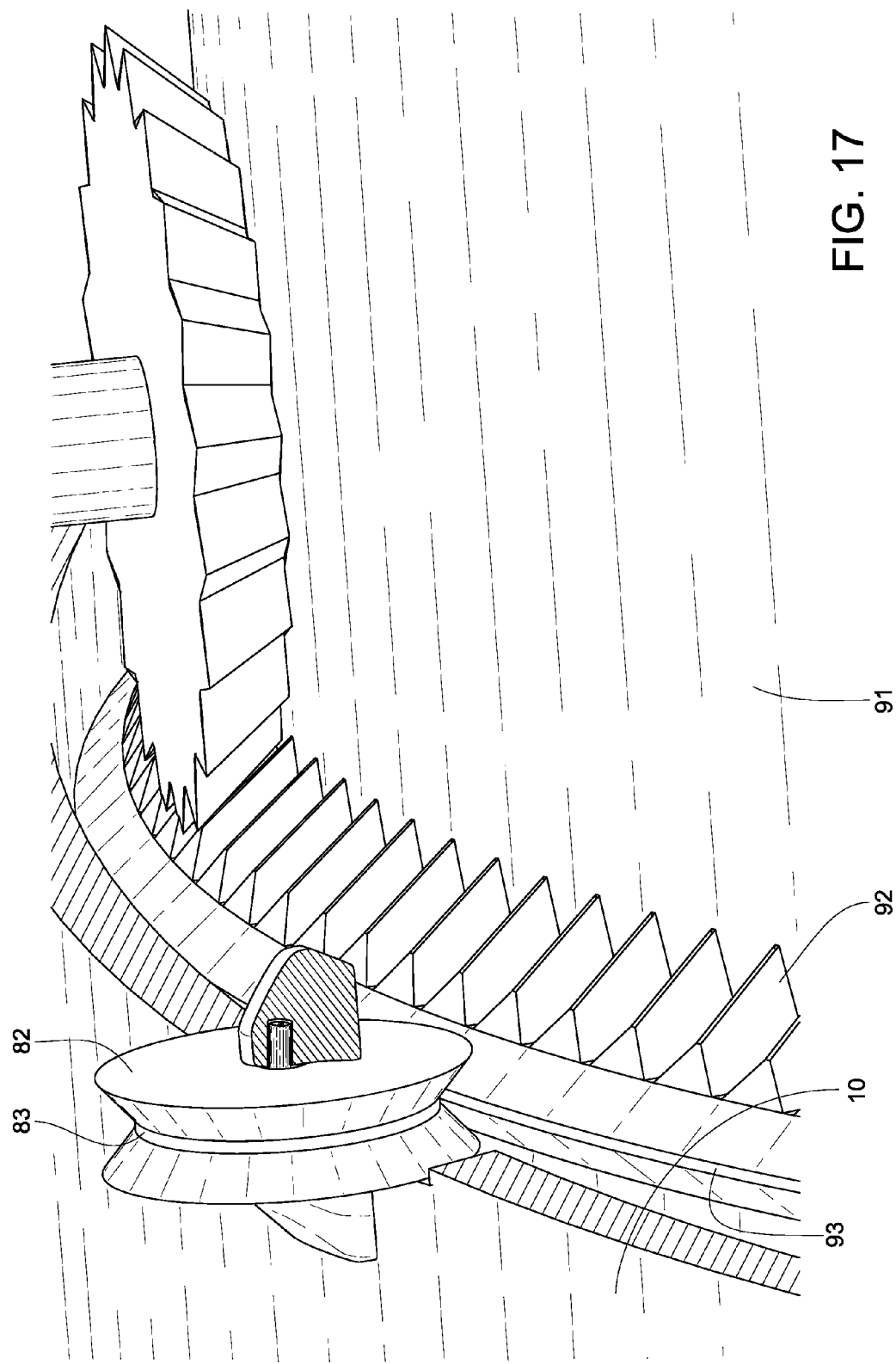
FIG. 17 depicts a cutaway view of a wheel (82) having a circumferential cutout (83) straddling and riding on a rail-ring apex (93) above gear-teeth cutouts (92) in the base of the rail-ring (91).

The apparatus further includes at least one gearwheel having teeth meshing with the cogs of the rail-ring base, the gearwheel rotating a drive shaft extending through the housing and associated with an electric generator. Ideally the gear-teeth cutouts (cogs) are located on the upstream side of the rail-ring, as is the associated gearwheel. The invention may include a plurality of rail-riding wheels extending into the lumen in cooperating alignment with the rail-ring apex Allowing rotation of the sleeve within the housing are a plurality of wheels (82) that ride along the apex (93) of the rail-ring within the housing lumen. In one embodiment, the wheels are mounted around the outer surface of the housing, but extend into the housing lumen through cut-out slots in the housing wall. (See FIG. 17.) In another version, the wheels are mounted around the inner surface of the housing; there may also be cut-out slots in the housing wall to allow each wheel to extend partly outside the housing. Each of the wheels has a circumferential cutout (83) for straddling the apex and extending partly towards the base. The base cogged portion of the rail-ring is preferably not contacted by a wheel. Ideally there are three or more wheels. One embodiment includes between 4 and 8 periodically spaced wheels extending into the lumen in cooperating alignment with the apex of the respective rail-ring.

The sleeve may include a plurality of the rail-rings, each with an associated plurality of wheels and each including a gearwheel having teeth meshing with the cogs. Each of the gearwheels may rotate a separate drive shaft extending through the housing and operably connected to an electric generator separate from the other gearwheels.

Although there may be different ways to construct the system, in general it is preferred to construct modules containing a rotary turbine blade assembly, with the module snugly fitting telescopically into the downstream opening of the housing. This will facilitate maintenance and repair of the turbines, and possibly facilitate the use of multiple turbines within one funnel housing system. Ideally, the drive shaft (and/or its cylindrical bushing sleeve) of the gearwheel is threaded through an aperture in the downstream end of the housing, after the turbine blade assembly is in place, so that the gearwheel can interact with the cogs of the cogged ring of the turbine blade assembly.

The funnel opening may be detachable from the throat-valve portion of the funnel housing, or integral therewith. Again, a detachable funnel portion will facilitate maintenance and repair of the throat-valve.

In use, the system may be submersed and anchored in a waterway, ideally where current is sufficiently steady and strong to assure adequate force to rotate the turbine blades so that a generator drive shaft can turn. The system should be orientated so that the funnel end is upstream, and the body of the housing is essentially parallel to the current flow. If the throat-valve is closed, it should be opened to allow the current flow to enter and initiate the vortical movement of the water. In the prototype depicted in the drawings, each of the pivot pins extends out of the funnel housing near the throat-valve, and is bent approximately perpendicularly; the free end extends through a pair of stops upstanding from an outer control collar surrounding the funnel housing. The tip of the free end of the pivot pin may also include a structure preventing the pivot pin from moving outside of the pair of stops. When the outer collar is rotated around the housing, the pairs of stops (capturing the pivot pins) are rotated as well, so that all the pivot pins are actuated simultaneously to open or close the throat-valve.

I claim:

1. An apparatus comprising a water collection component and a turbine for a hydro-electric generator system to generate electricity from water current, the apparatus comprising:

(a) a housing including an upstream funnel end and a downstream turbine end and defining a lumen therebetween, said funnel end defining a constricting lumen orientable in a same direction as the water current and focusing water flow of the water current into the lumen, the housing and the lumen sharing a longitudinal lumen axis generally aligned in the same direction as the water current;

(b) said constricting lumen terminating at a throat portion of said housing;

(c) said downstream turbine end comprising at least one turbine having a plurality of blades, each blade extending longitudinally in a same direction as the lumen axis and including a primary face diagonally opposed to the water flow, the at least one turbine rotatable around the lumen axis; and (d) said throat portion including a throat-valve including three adjacent pivot-plates and a coordination means for coordinating an opening and closing of the pivot-plates, each plate having a pivot edge having a mid-point with a mid-point interface for pivoting coordination with corresponding nearby mid-point interfaces of the other pivot-plates, the mid-point interface of each pivot-plate being maintained in coordinating proximity to the mid-point interfaces of the other pivot-plates, the pivoting coordination of the pivot-plates allowing for each pivot-plate to diagonally overlap the adjacent pivot-plates, such that the throat-valve, when in an open configuration defined by the opening of the pivot-plates, enhances a vortical movement of the water flow to the blades.

2. An apparatus as described in claim 1, each pivot-plate comprising a half-disc configuration including the pivot edge and a circumferential edge, such that the pivot edge is a straight edge and the circumferential edge has a curvature which closely follows a curvature of an interior wall of the lumen, each pivot-plate pivoting on a pivot pin extending from the circumferential edge of the pivot-plate through a wall of the housing, each pivot pin connecting a respective pivot-plate to the coordination means.

3. An apparatus as described in claim 2, the coordination means comprising an outer collar encircling the throat portion, each of the pivot-plate pivot pins comprising an exterior end yoked to the collar such that rotation of the collar around the throat portion causes coordinated pivoting of all the pivot-plates for opening or closing the throat-valve.

4. An apparatus as described in claim 1, further comprising a cone affixed within said lumen immediately upstream of said turbine, the cone having a base and an apex, the apex pointing upstream within the water flow and the base located a sufficient distance from said housing to allow said water flow to more quickly flow between said base and said housing.

5. An apparatus as described in claim 1, each of the blades comprising an upstream axial corner region anchored to an axle-tip carried by an upstream axial support bearing shared by all of the blades, each of the blades having a downstream axial corner region anchored to an axle-tip carried by a downstream axial support bearing shared by all of the blades, each of the axial support bearings mounted at a respective convergence of a plurality of upstream radial struts and a plurality of downstream radial struts anchored within the housing.

6. An apparatus as described in claim 5, each of the blades comprising a peripheral edge, an axial edge, and the primary face, the primary face being an essentially vertically curved primary face between the edges, the entire upstream-to-downstream length of which receives force from the water flow through the lumen, causing the blades to rotate around said axial bearings.

7. An apparatus as described in claim 1, said downstream turbine end comprising a plurality of said turbines aligned sequentially within the housing, each of said turbines independently driving at least one respective drive shaft rotating an electric generator.

8. An apparatus as described in claim 1, the downstream turbine end further comprising an axle-less means for governing blade rotation around the lumen axis.

9. An apparatus as described in claim 8, the means for governing blade rotation comprising:
(a) a sleeve of the at least one turbine, the sleeve being telescopically received within the housing and having an inner surface connected to and supporting the plurality of blades, each blade having an outer peripheral edge anchored to the sleeve and having an inner axial edge separated by a short distance from the lumen axis such that an interior passageway is formed about the lumen axis by the inner axial edges of the plurality of blades, with the primary face of each blade being a vertically curved primary face extending between the peripheral edge and the axial edge;
(b) said sleeve further including at least one rail-ring encircling an outer circumference of said sleeve, said rail-ring comprising a base portion including cogs, and an apex upstanding from the base;
(c) said means for governing blade rotation further comprising, for the at least one rail-ring, a plurality of rail-riding wheels anchored to the housing and extending into the lumen in cooperating alignment with said rail-ring apex; and
(d) the apparatus further comprising at least one gearwheel having teeth meshing with said cogs, the gearwheel rotating a drive shaft, the drive shaft extending through the housing and operably engaging with an electric generator;
(e) wherein rotation of the blades by the water flow causes sleeve rotation constrained by said rail-riding wheels, thereby causing rotation of the at least one rail-ring, thereby causing rotation of the gearwheel and the drive shaft connected thereto, thereby causing generation of electricity by the electric generator operatively engaged thereto.

10. An apparatus as described in claim 9 wherein, for the at least one rail-ring, said wheels comprising at least eight wheels periodically extending into the lumen in cooperating alignment with said rail-ring apex.

11. An apparatus as described in claim 10, wherein:
(a) the at least one rail-ring comprises a base anchored to said sleeve and has an upstream side and a downstream side, at least one of said sides having a plurality of said cogs comprising periodically-spaced gear-teeth cutouts, said rail-ring further comprising an essentially pointed apex upstanding from said sides;
(b) each of said wheels having a circumferential cutout straddling said apex and extending partly towards said sleeve on each side of the apex without contacting said gear-teeth cutouts; and
(c) said apparatus further comprising a rotary drive shaft having a gearwheel having gear teeth that mesh with said gear-teeth cutouts of said rail-ring.

12. An apparatus as described in claim 11, said gear-teeth cutouts located on said upstream side of said rail-ring.

13. An apparatus as described in claim 12, said sleeve including a plurality of said rail-rings, each having a plurality of said wheels aligned therewith, each rail-ring having at least one gearwheel meshing therewith, each of said gearwheels rotating at least one of said drive shafts extending through the housing and operably engaging with a respective electricity generator.

14. An apparatus comprising a water collection component and a turbine for a hydro-electric generator system to generate electricity from water current, the apparatus comprising:
(a) a housing including an upstream funnel end and a downstream turbine end and defining a lumen therebetween, said funnel end defining a constricting lumen orientable in a same direction as the water current and focusing water flow of the water current into the lumen, the housing and the lumen sharing a longitudinal lumen axis generally aligned in the same direction as the water current; said constricting lumen terminating at a throat portion of said housing, said throat portion including a throat-valve;
(b) said downstream turbine end comprising at least one turbine comprising a sleeve telescopically received within the housing, the sleeve having an inner surface connected to and supporting a plurality of blades, each blade having an outer peripheral edge anchored to the sleeve and having an inner axial edge separated by a short distance from the lumen axis such that an interior passageway is formed about the lumen axis by the inner axial edges of the plurality of blades, each blade having a vertically curved primary face between the peripheral edge and the axial edge; and
(c) said turbine end further comprising a means for governing blade rotation including at least one rail-ring encircling an outer circumference of said sleeve, said rail-ring comprising a base portion including a plurality of gear-teeth cutouts, and an apex upstanding from said base portion, said means for governing blade rotation further comprising a plurality of rail-riding wheels anchored to said housing and extending into the lumen in cooperating alignment with said rail-ring apex, said means for governing blade rotation further comprising at least one gearwheel having teeth meshing with said gear-teeth cutouts, said gearwheel rotating a drive shaft extending through the housing and operably engaging with an electric generator;

(d) wherein rotation of the blades by the water flow causes sleeve rotation and consequent rail-ring rotation, thereby causing rotation of each gearwheel and drive shaft connected thereto, thereby causing generation of electricity by the electric generator operatively engaged thereto.

15. An apparatus as described in claim 14, further comprising an annular convergence collar anchored within the housing immediately upstream of said sleeve.

\* \* \* \* \*